(12) United States Patent
Hogan et al.

(10) Patent No.: US 9,367,484 B2
(45) Date of Patent: Jun. 14, 2016

(54) SYSTEM AND APPARATUS FOR CONTROLLING USE OF MASS STORAGE DEVICES

(71) Applicants: Linda R. Stilwell, Hampton, NH (US); Robert F. Hogan, Portsmouth, NH (US); A. Christian Jackson, Hudson, NH (US)

(72) Inventors: Robert F. Hogan, Portsmouth, NH (US); A. Christian Jackson, Hudson, NH (US); Larry R. Stilwell, Fremont, NH (US)

( * ) Notice: Subject to any disclaimer, the term of this patent is extended or adjusted under 35 U.S.C. 154(b) by 0 days.

(21) Appl. No.: 14/337,201

(22) Filed: Jul. 21, 2014

(65) Prior Publication Data
US 2014/0380010 A1    Dec. 25, 2014

Related U.S. Application Data

(63) Continuation-in-part of application No. 12/156,664, filed on Jun. 2, 2008, now Pat. No. 8,788,723.

(60) Provisional application No. 60/932,860, filed on Jun. 1, 2007.

(51) Int. Cl.
| | |
|---|---|
| G06F 3/00 | (2006.01) |
| G06F 12/14 | (2006.01) |
| G06F 11/30 | (2006.01) |
| G06F 13/38 | (2006.01) |
| G06F 9/46 | (2006.01) |
| G06F 11/00 | (2006.01) |
| G06F 3/06 | (2006.01) |

(52) U.S. Cl.
CPC .............. *G06F 12/1408* (2013.01); *G06F 9/46* (2013.01); *G06F 11/00* (2013.01); *G06F 11/3034* (2013.01); *G06F 12/14* (2013.01); *G06F 13/38* (2013.01); *G06F 13/382* (2013.01); *G06F 13/385* (2013.01); *G06F 3/0631* (2013.01); *G06F 3/0632* (2013.01); *G06F 2212/402* (2013.01); *G06F 2221/0797* (2013.01)

(58) Field of Classification Search
None
See application file for complete search history.

(56) References Cited

U.S. PATENT DOCUMENTS

| | | | | |
|---|---|---|---|---|
| 5,654,905 A | * | 8/1997 | Mulholland et al. | 702/186 |
| 2003/0056051 A1 | * | 3/2003 | Burke et al. | 710/302 |
| 2006/0218320 A1 | * | 9/2006 | Avraham et al. | 710/62 |

* cited by examiner

*Primary Examiner* — Henry Tsai
*Assistant Examiner* — Juanito Borromeo
(74) *Attorney, Agent, or Firm* — Lorusso & Associates

(57) ABSTRACT

Disclosed is a software program, USB monitoring software agent. USB monitoring software agent is a software program that monitors all USB ports of a computer and provides real-time detection of all USB devices connected to a USB port. As a USB device is detected, the device is identified, categorized, cataloged and logged in a secure persistent store, prompted for a challenge policy of use if so configured, prevent the USB device from being used if so configured, transmit information about the detected USB device to a local or remote repository by a selected industry standard telecommunication method. A method of creating a digital photograph and/or a video recording to record and identify a user of the computer contemporaneous with the insertion/removal/ejection of a USB device into or out of the computer is disclosed also.

20 Claims, 27 Drawing Sheets

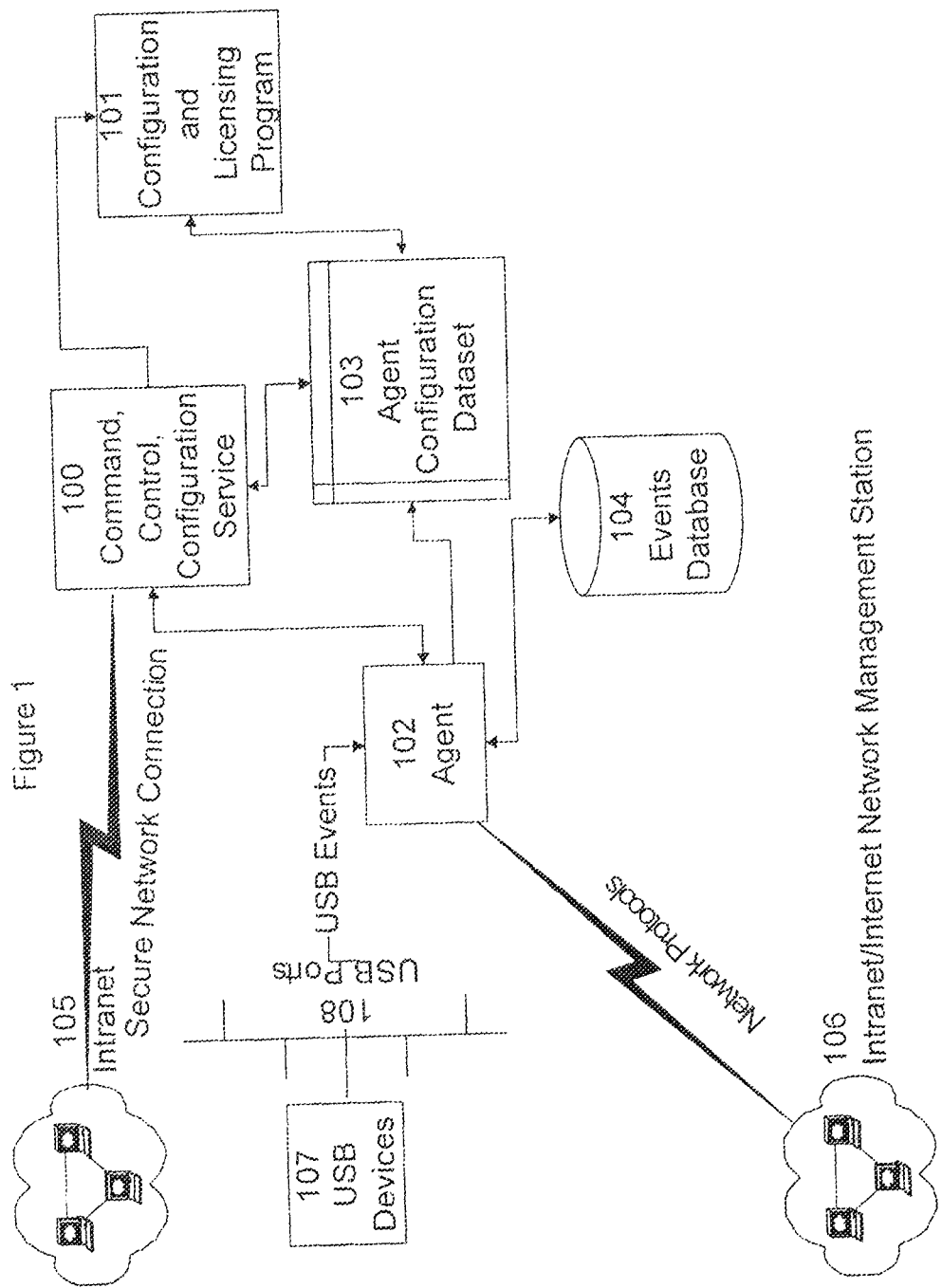

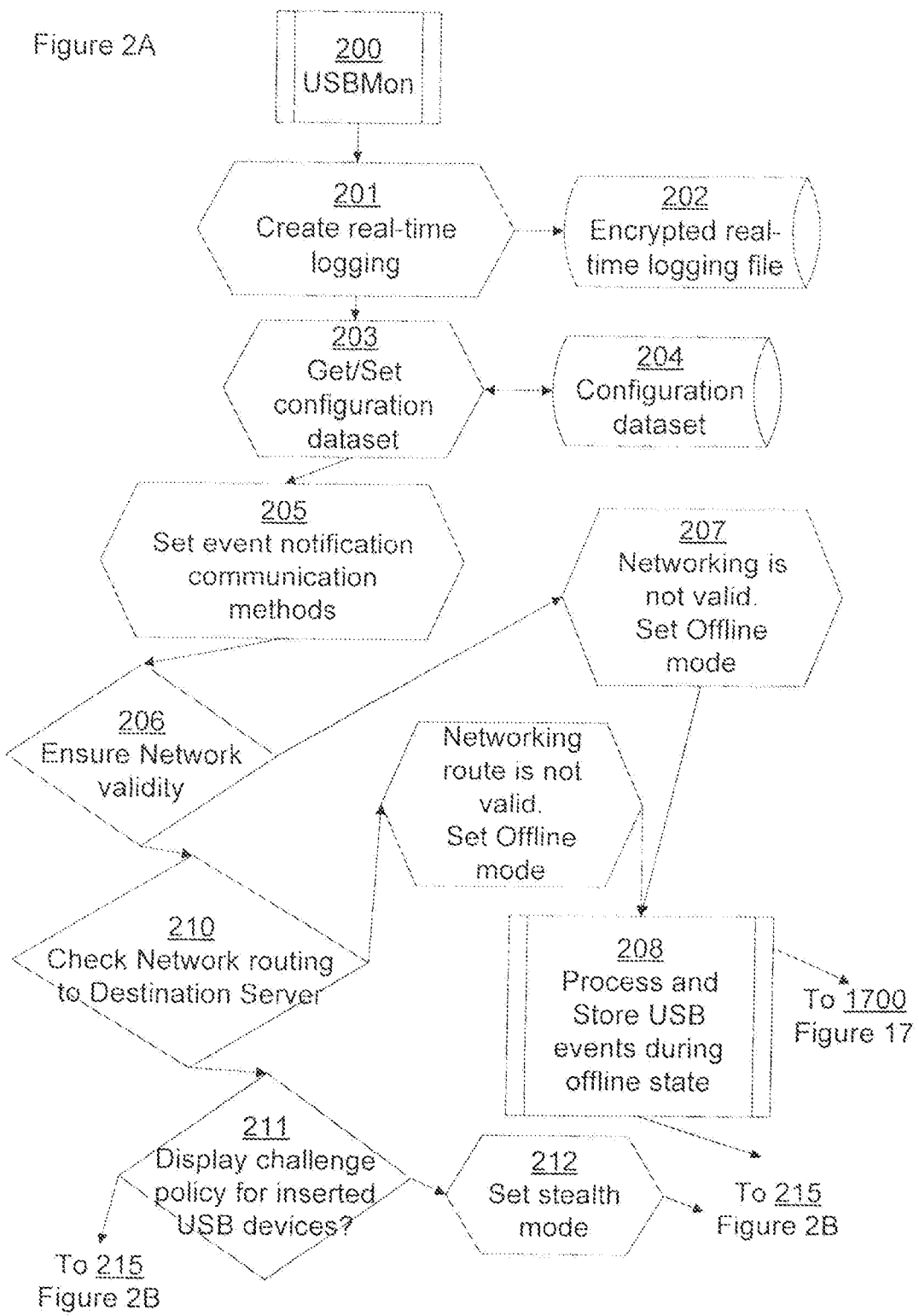

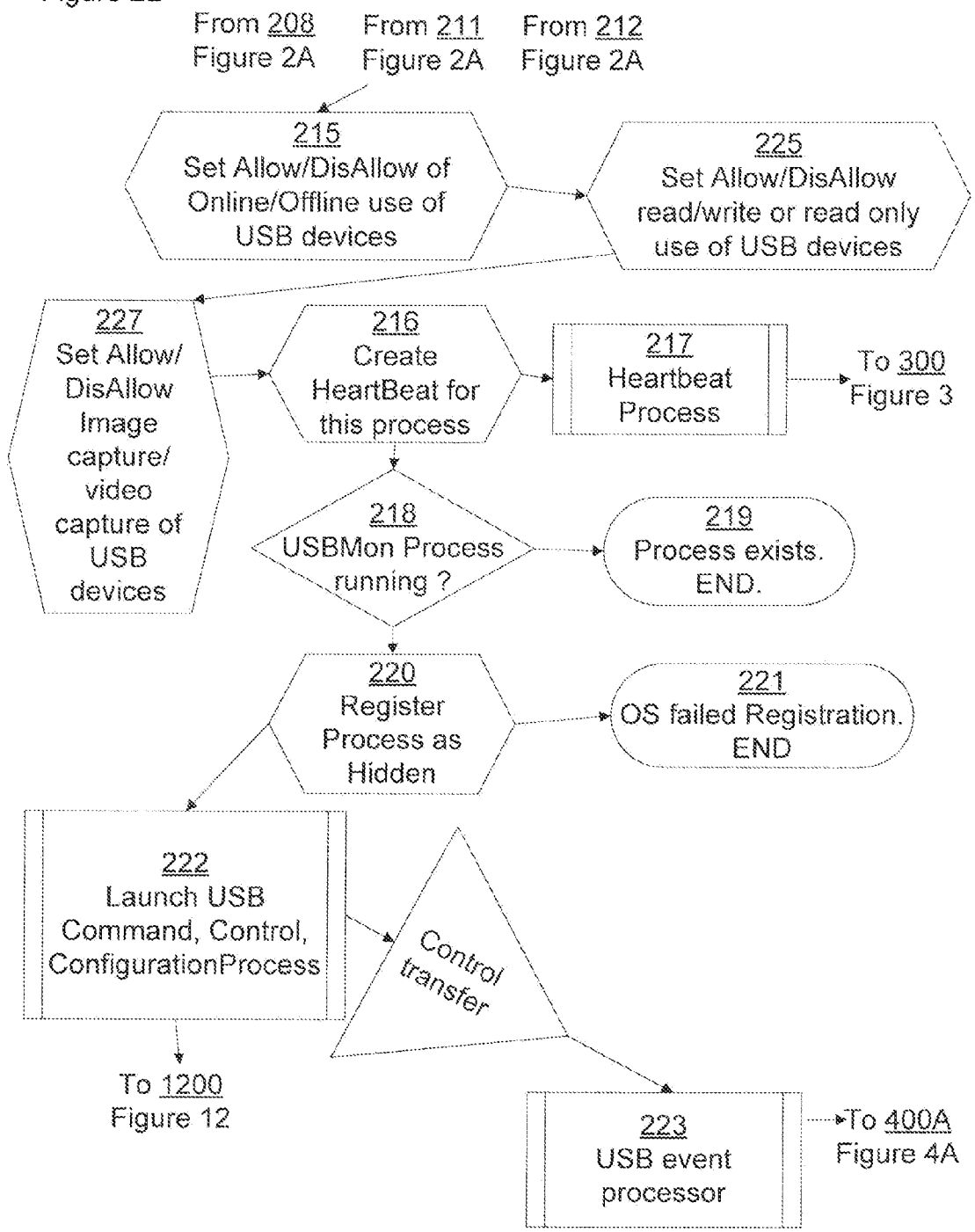

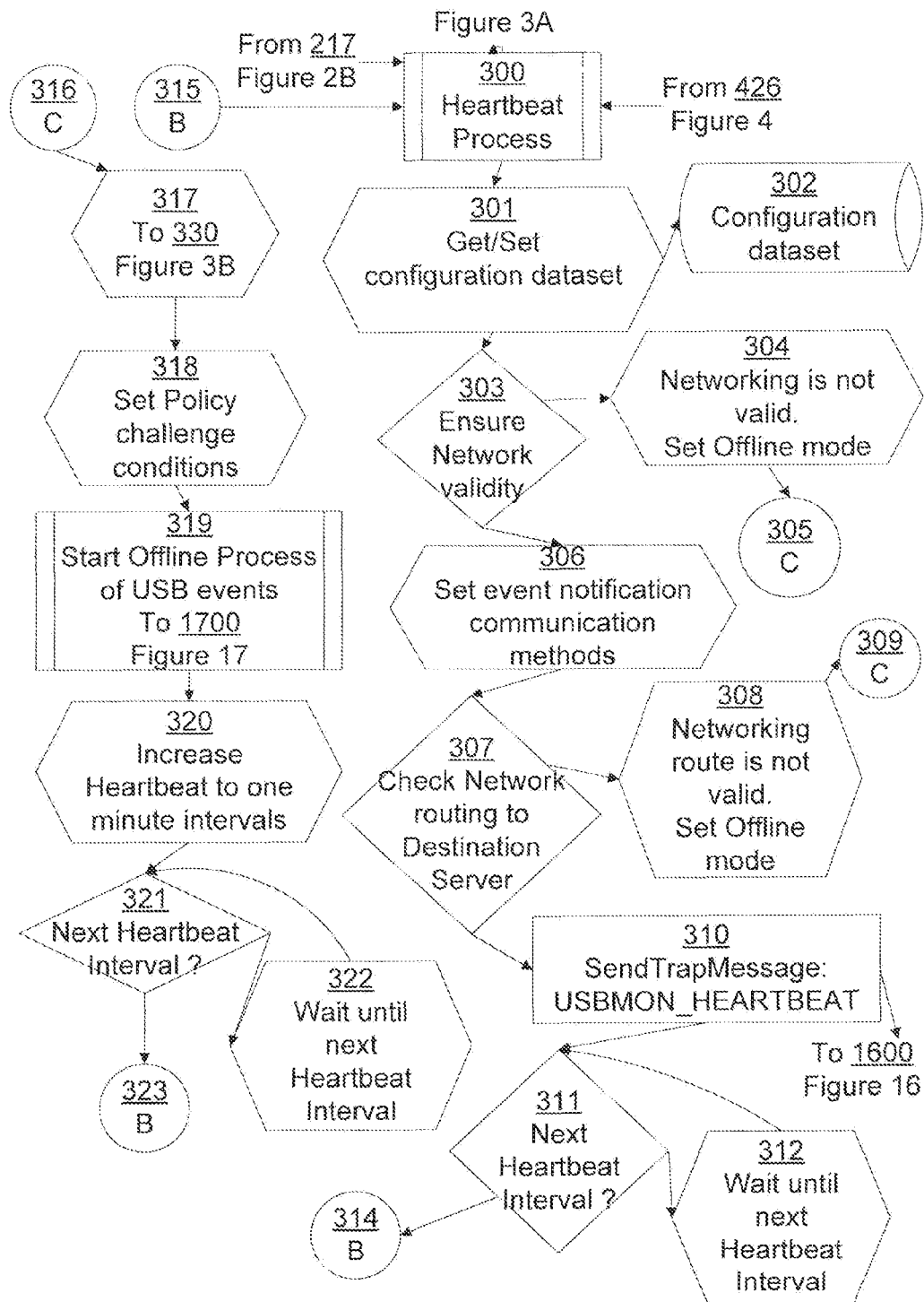

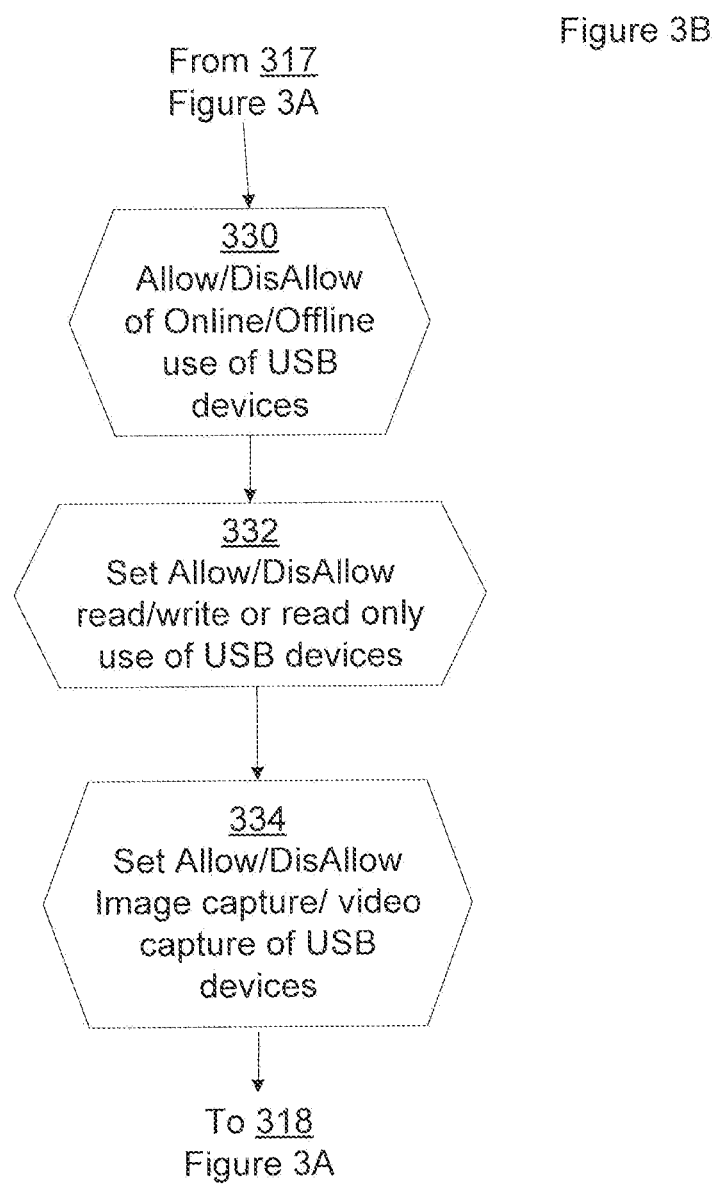

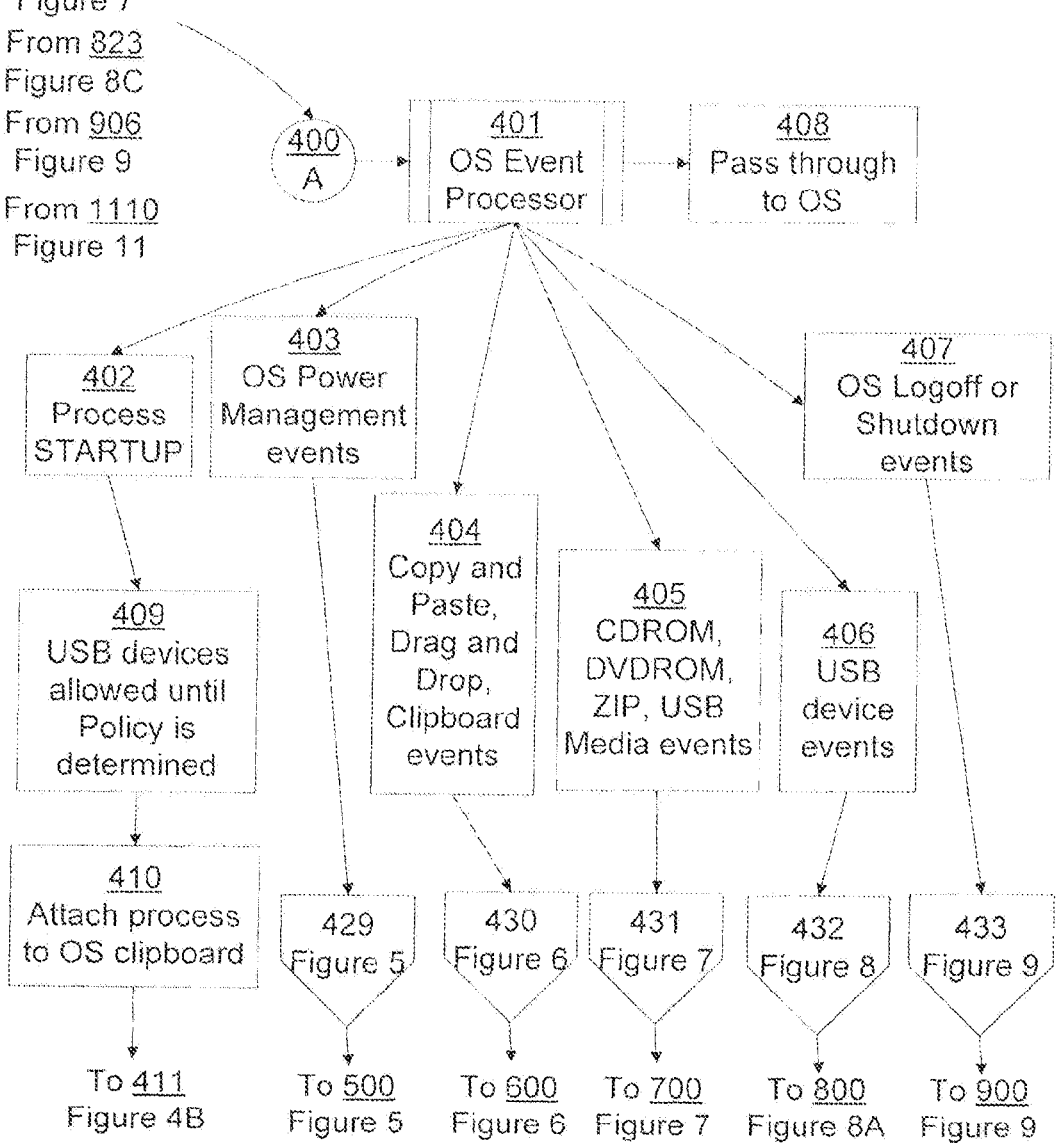

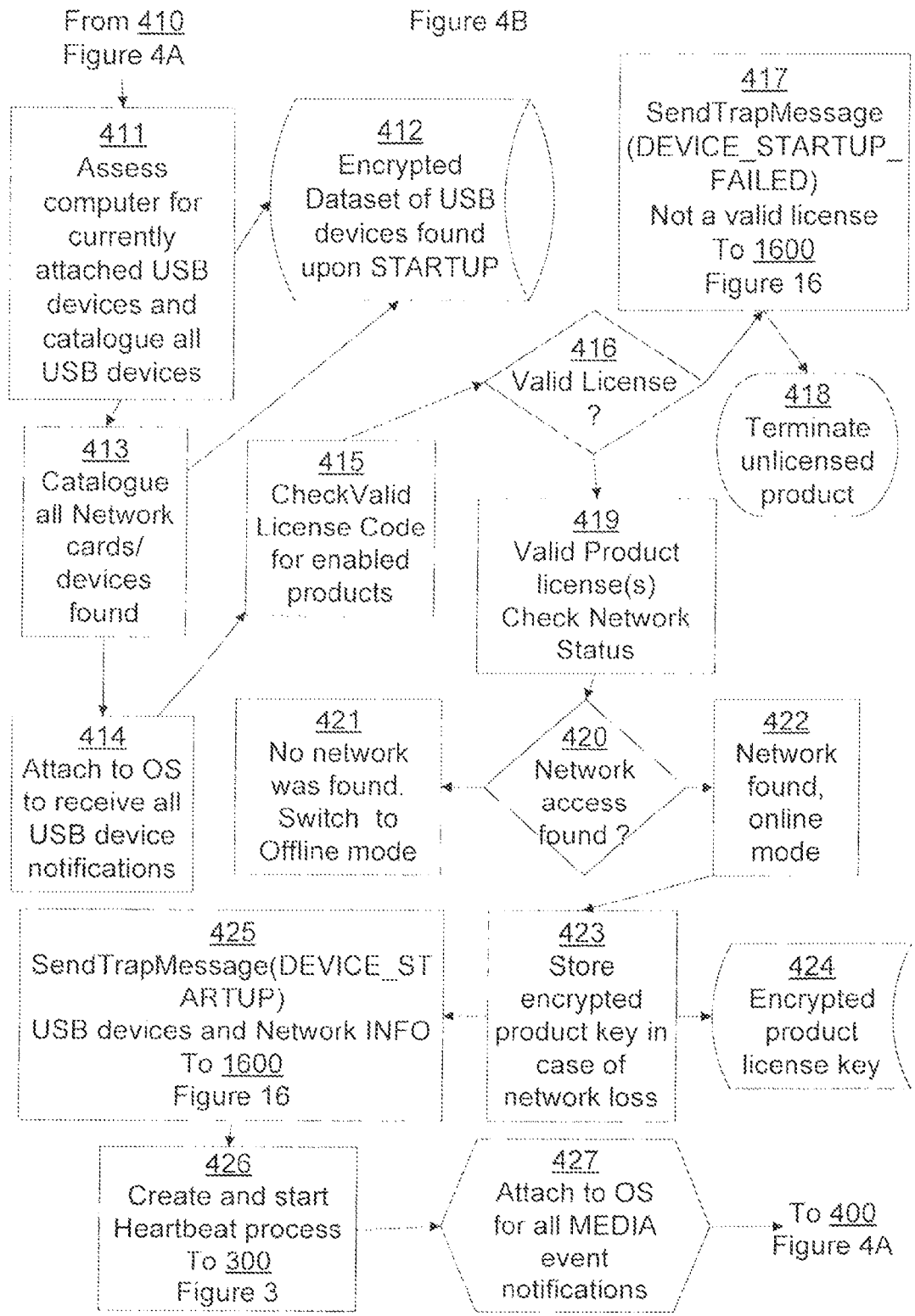

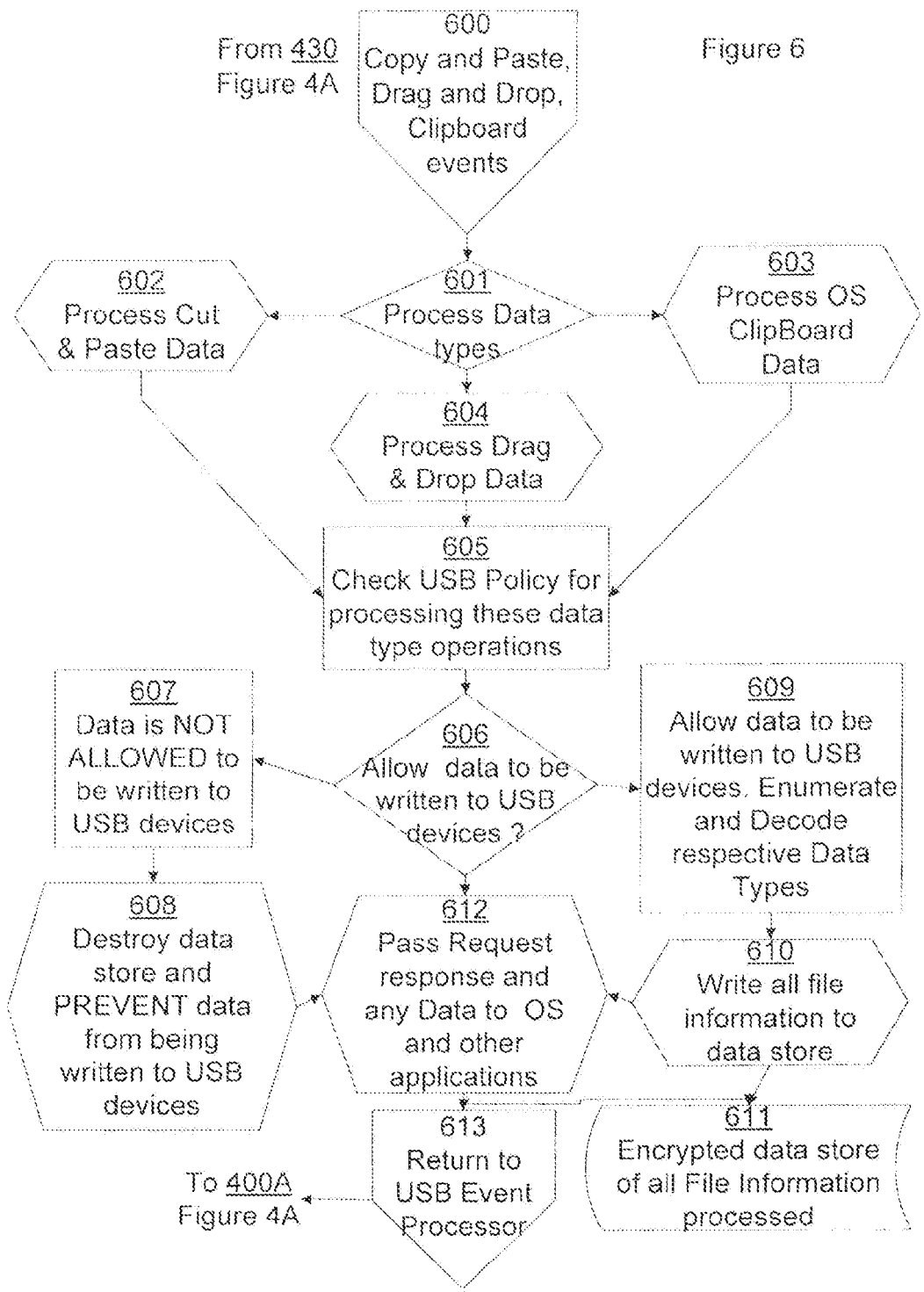

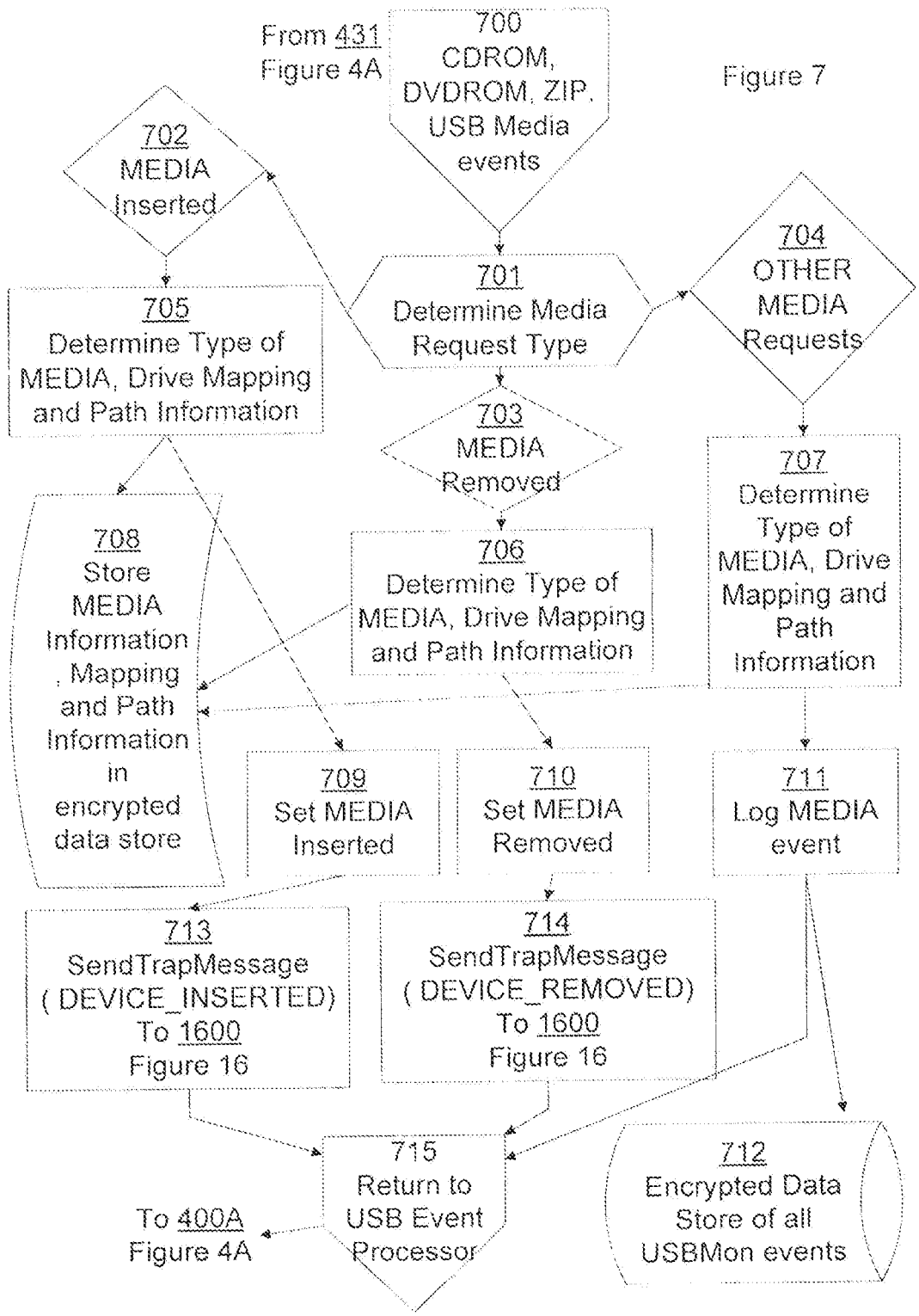

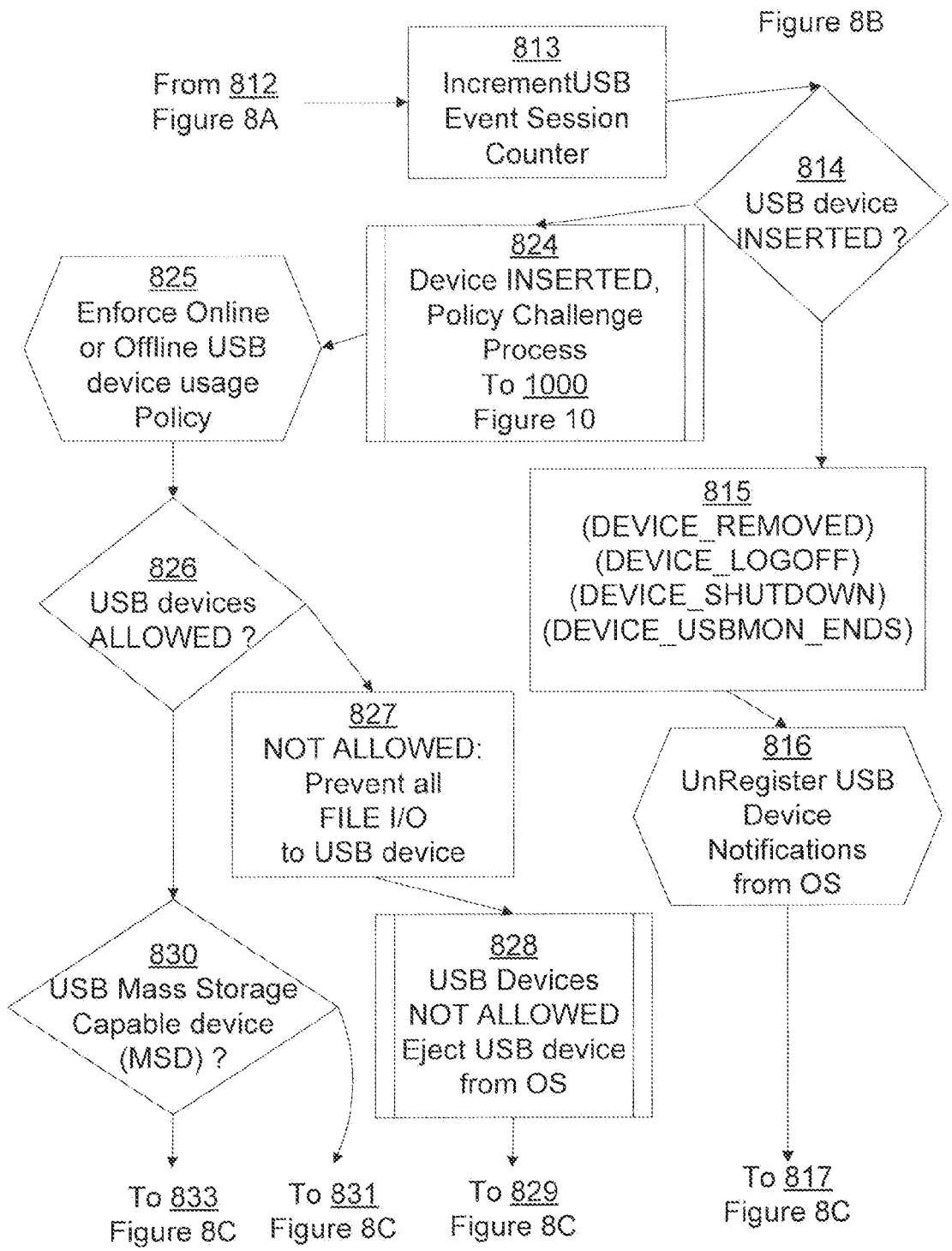

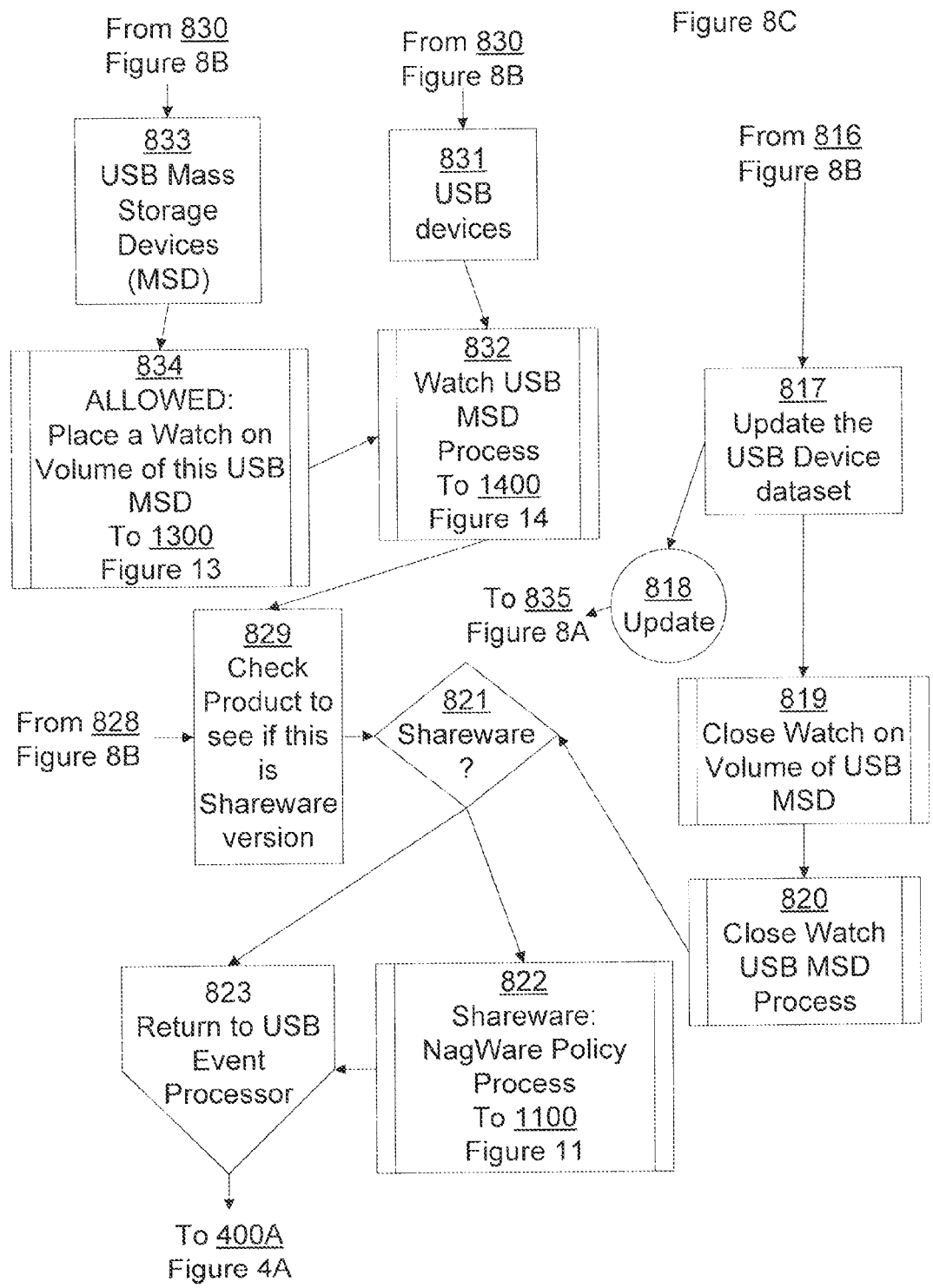

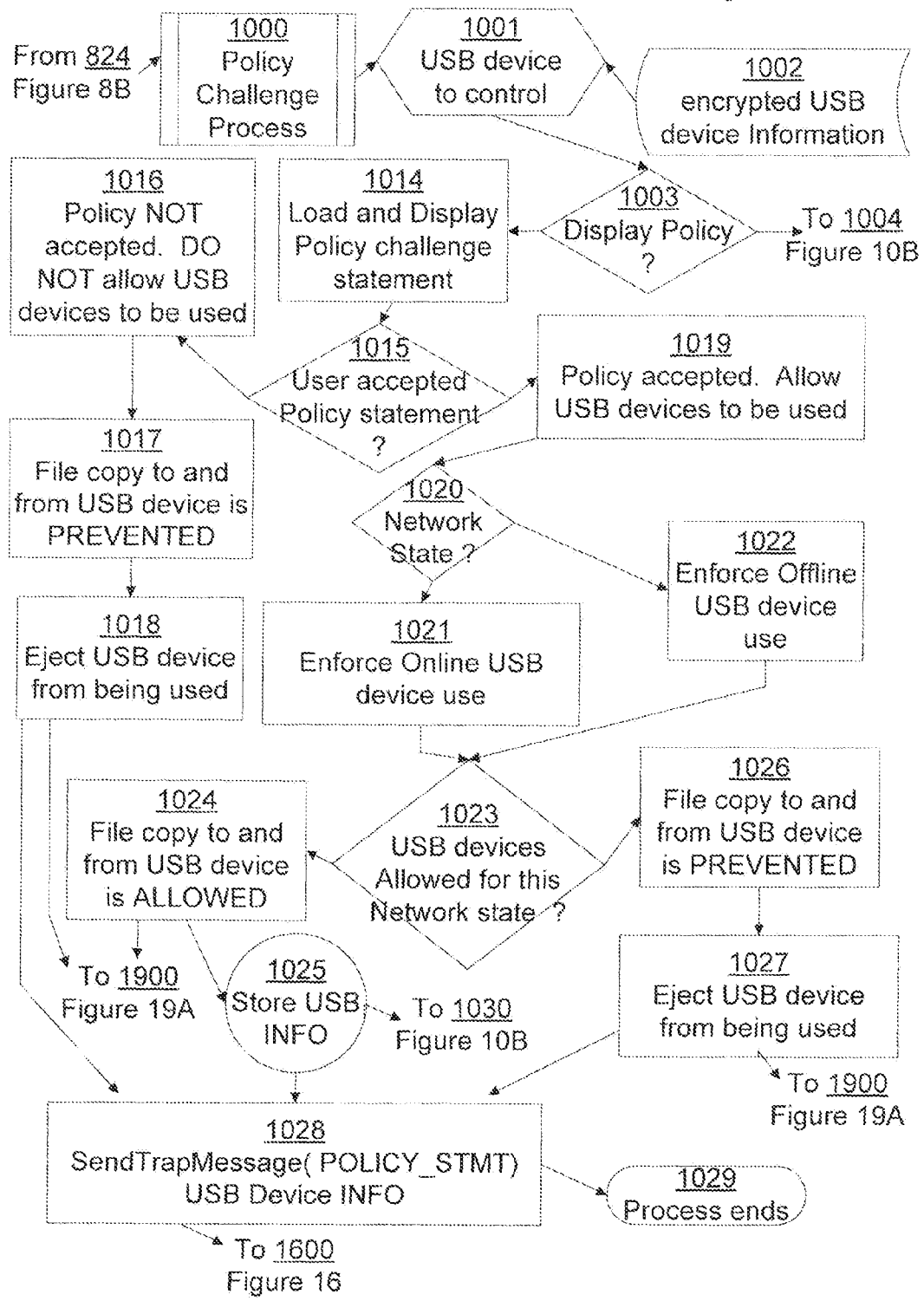

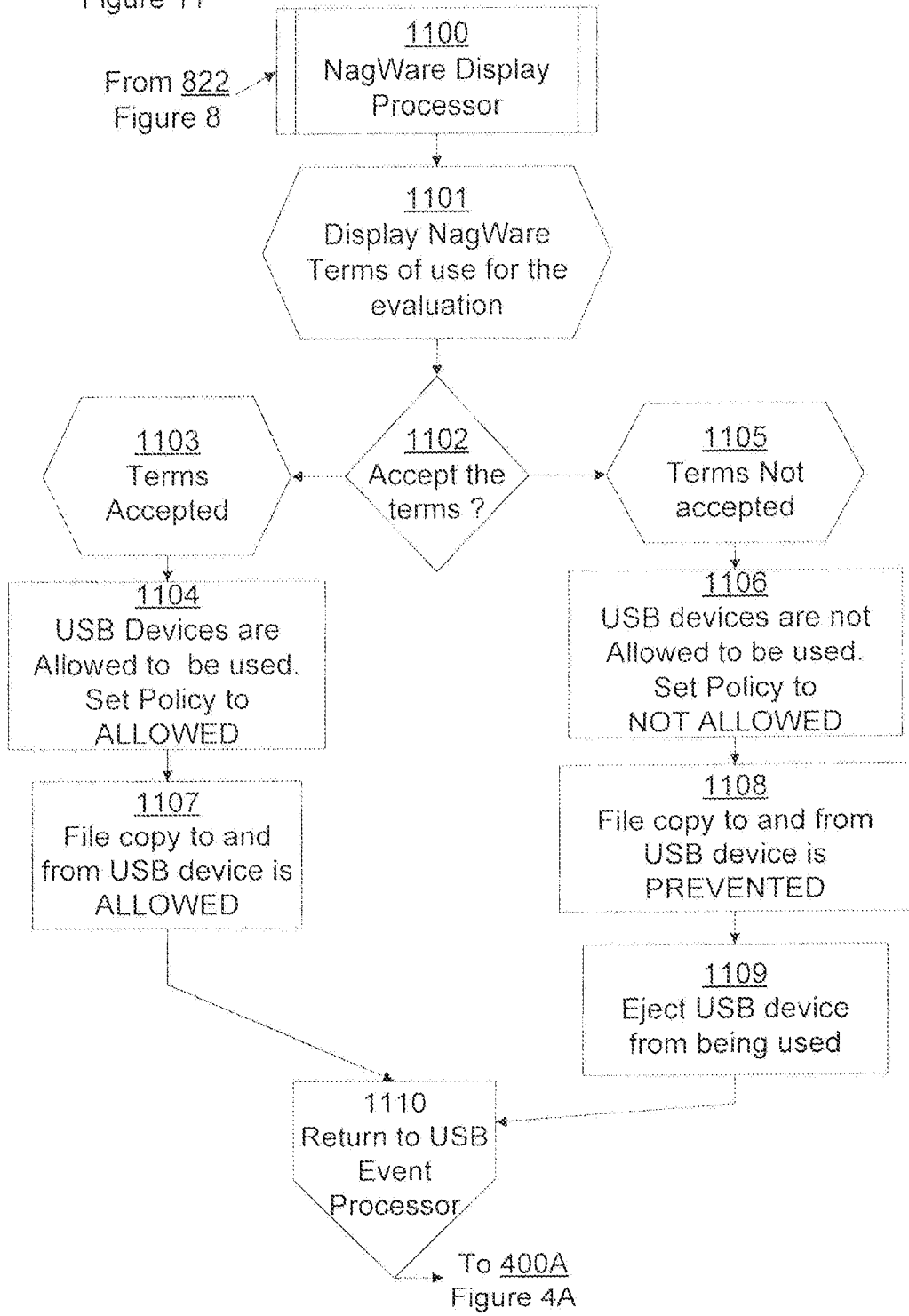

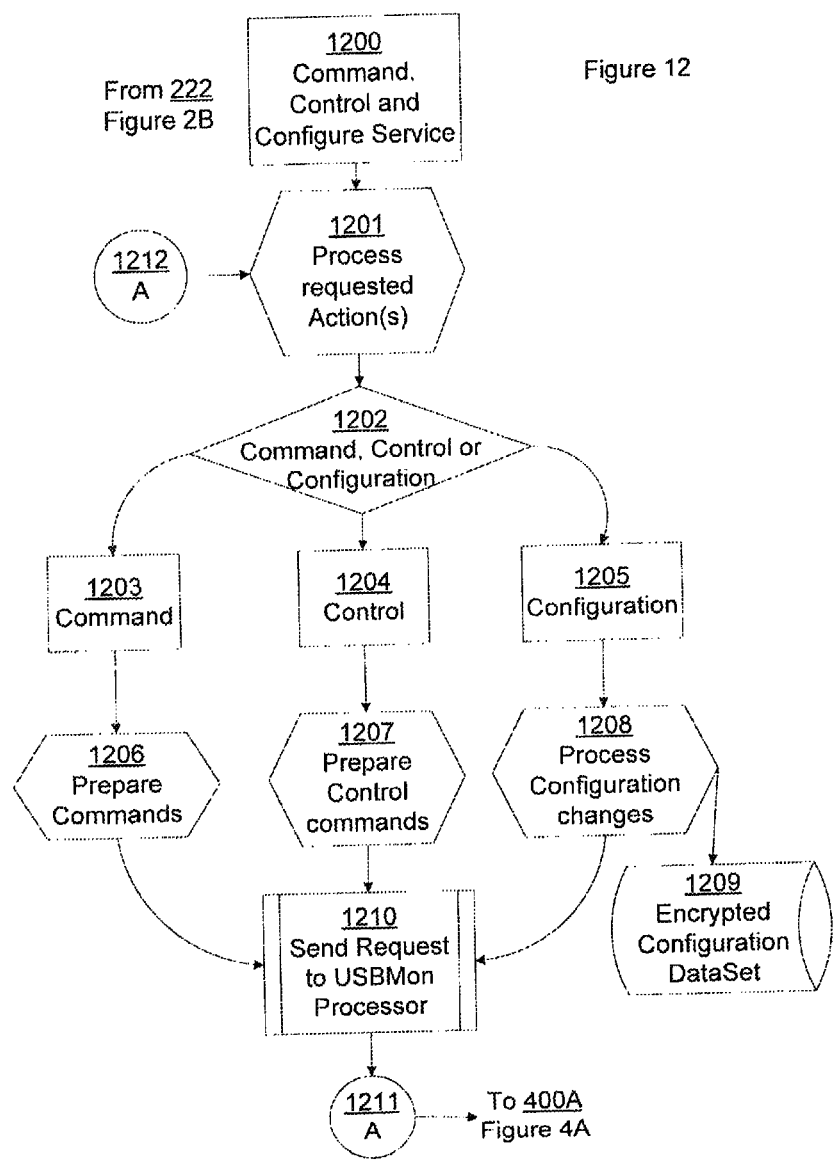

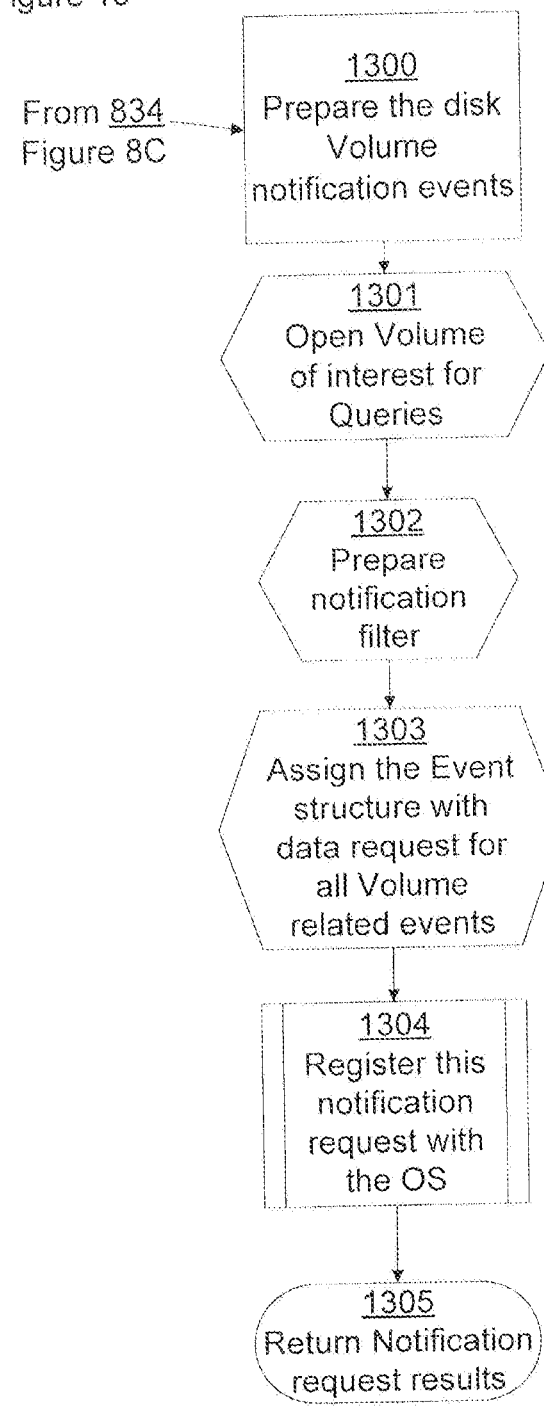

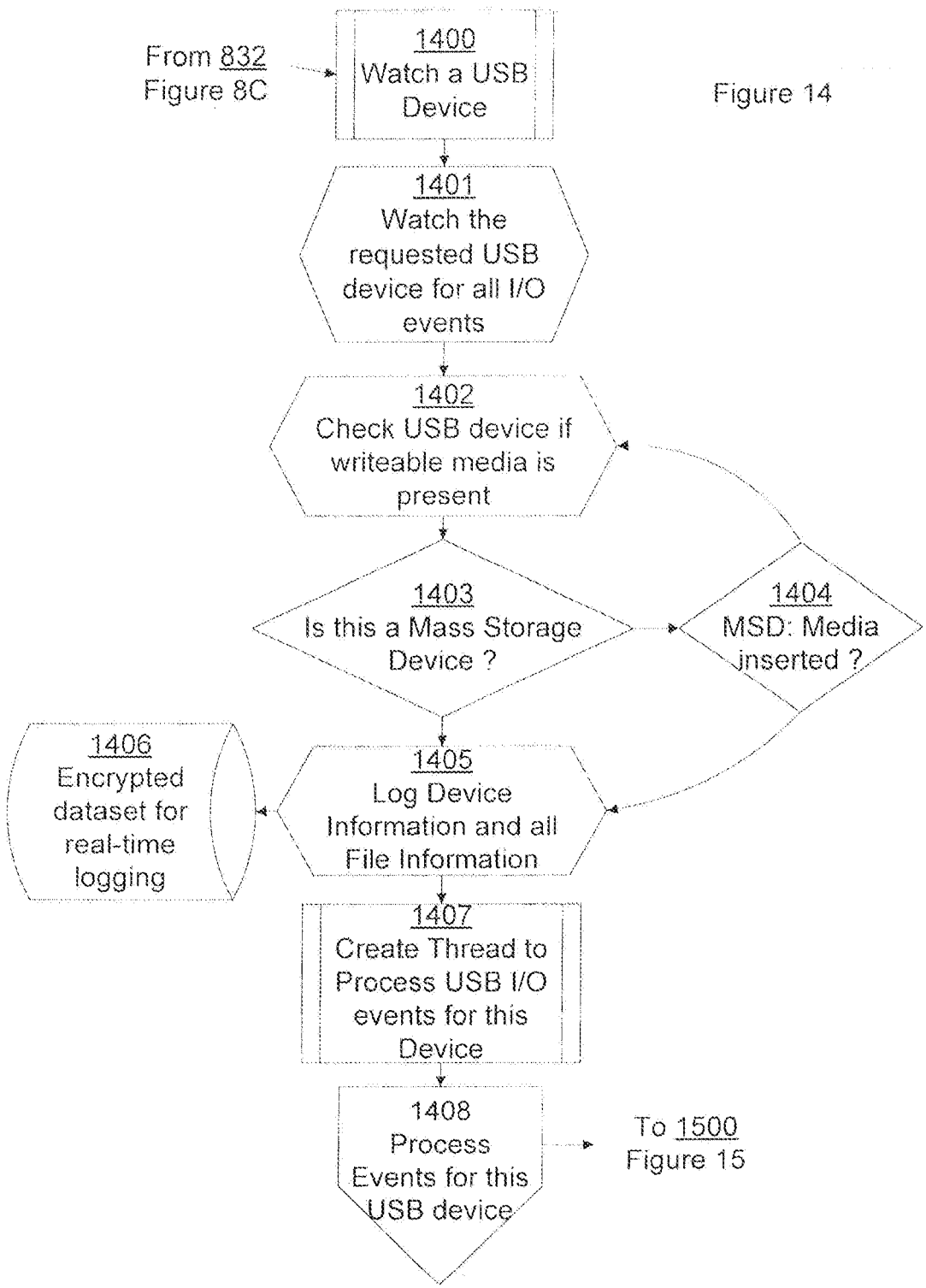

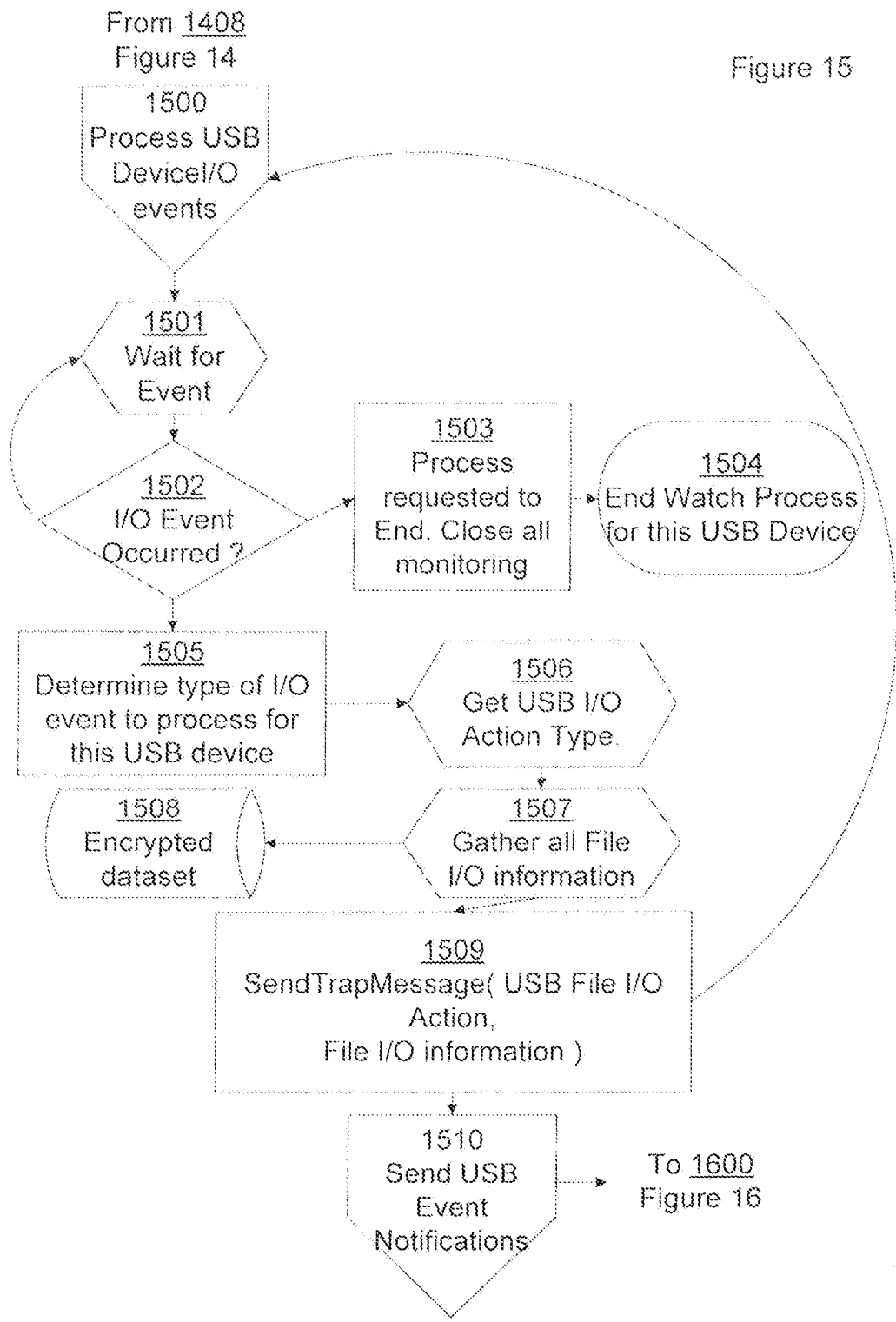

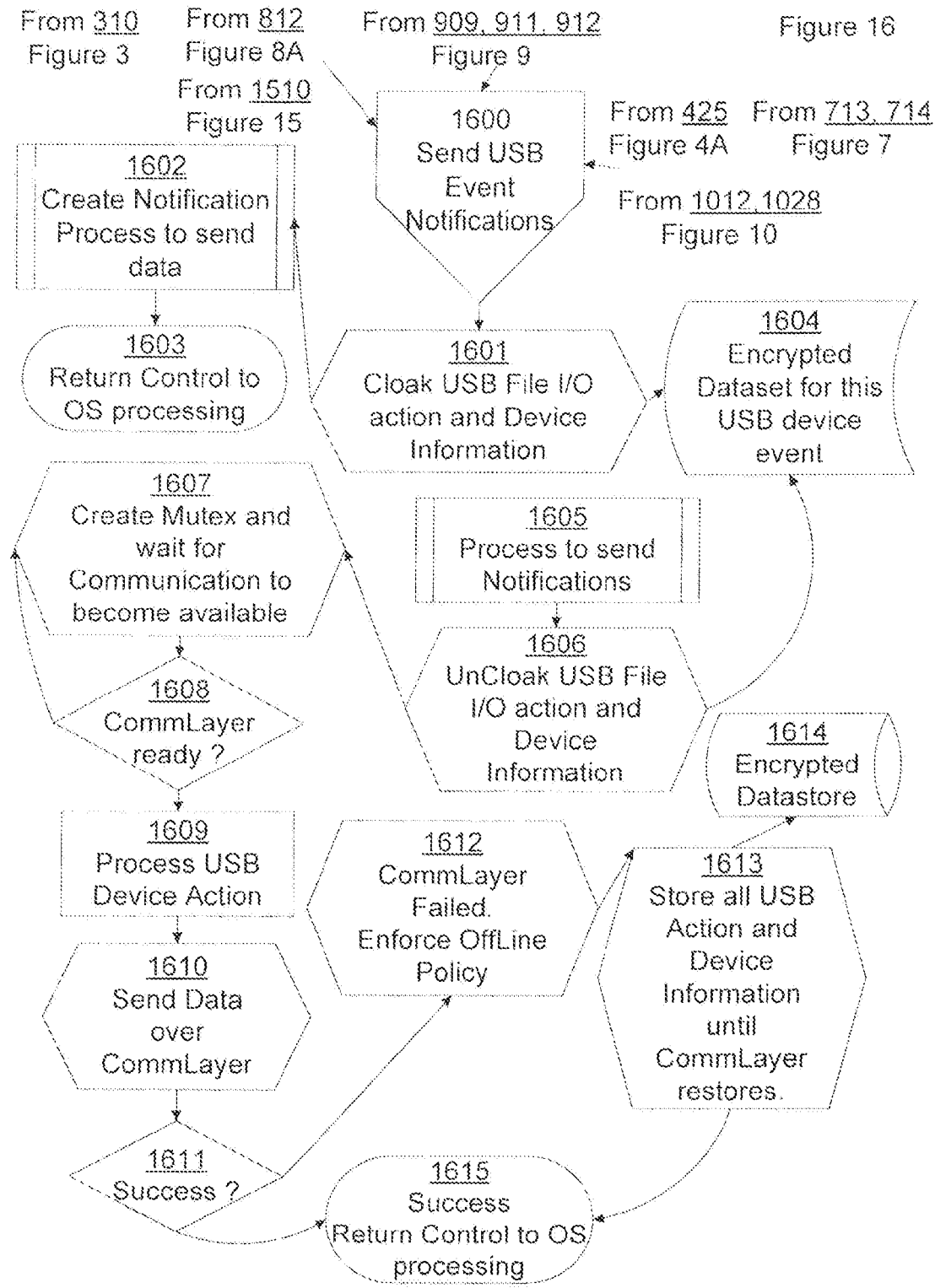

EXAMPLE OF A COMPANY POLICY ON THE USE OF USB MASS STORAGE DEVICES

Refer to the permitted use of corporate resources in your employee handbook or call IT services at 123-456-7890.

This policy is owned and approved by the IT security officer.

The use of USB Mass Storage Devices is permitted only for business tasks and with business-owned resources. Business tasks are tasks conducted by persons in the direct or indirect employ of the company, in order to achieve the stated business goals of the company. USB Mass Storage Devices are business owned resources if the devices are named and inventoried assets of the company. Digital content is considered a business-owned resource if it is required to achieve the stated business goals of the company. Such digital content may or may not be a named and inventoried asset of the company.

All other USB Mass Storage Devices on business premises or in use by employees are considered personal property. All other digital content is considered personal property. Such personal property may not be used on business premises without prior written authorization by the IT security officer.

This policy's restrictions on the use of USB Mass Storage Devices include but are not limited to the following scenarios:
1. Removal of digital content from premises. It is not permitted and it may be illegal to remove digital content from business premises. Do not assume that because you have the file access rights to read, modify, and/or copy digital content that you have permission or the legal right to copy that digital content to a USB Mass Storage Device that could subsequently be used to make the digital content available to someone else, or to be otherwise available for use in tasks that are not required to achieve the stated business goals of the company.

2. Engaging in any scenario involving USB MAss Storage Devices. The following scenarios involving USB Mass Storage Devices are provided as typical but not exhaustive examples of scenarios that are restricted under this policy. These scenarios are permitted only with prior written authorization by the IT security officer:

FIG. 18A

A. Use of personal USB Mass Storage devices on business premises.

B. Use of personal USB Mass Storage entertainment devices (including digital cameras, MP3 players, iPods, game decks, DVD players, and mobile phones) on business premises.

C. Use of business-owned USB Mass Storage devices to perform tasks of a personal nature. No employee may use business-owned USB Mass Storage Devices to store personal digital content (including but not limited to images, audio, software, and documents), nor can that personal digital content be transferred to business-owned resources (including but not limited to computers, networks, or storage media).

D. Use of any USB-enabled network connectivity equipment. No USB Mass Storage network connectivity equipment (wireless LAN terminal, etc.) may be used in business-owned computer equipment.

It is a further violation of this policy to tamper with or remove from any USB Mass Storage Device digital material (including but not limited to software and log files) that may be required to monitor or record the use of USB Mass Storage Devices.

Persons in direct or indirect employ of the company and any others who fail to comply with the provisions of this policy may face disciplinary action that could result in termination of employment, and/or legal prosecution.

By accepting this policy, you further acknowledge that the use of all USB Mass Storage Devices is monitored and reviewed by the IT security officer. This includes but is not limited to USB Mass Storage Devices that may be inserted into or removed from a USB-port, and any digital content that may be written to or read from a USB Mass Storage Device. Such events are electronically recorded and/or reported, and notification may be delivered immediately to the IT security officer.

I have read and I accept the above EXAMPLE policy:

Vendor: SanDisk Corporation, ProductID: 21808, SN: 1737300A0108291, Port#:1 as Drive(E:)

FIG. 18B

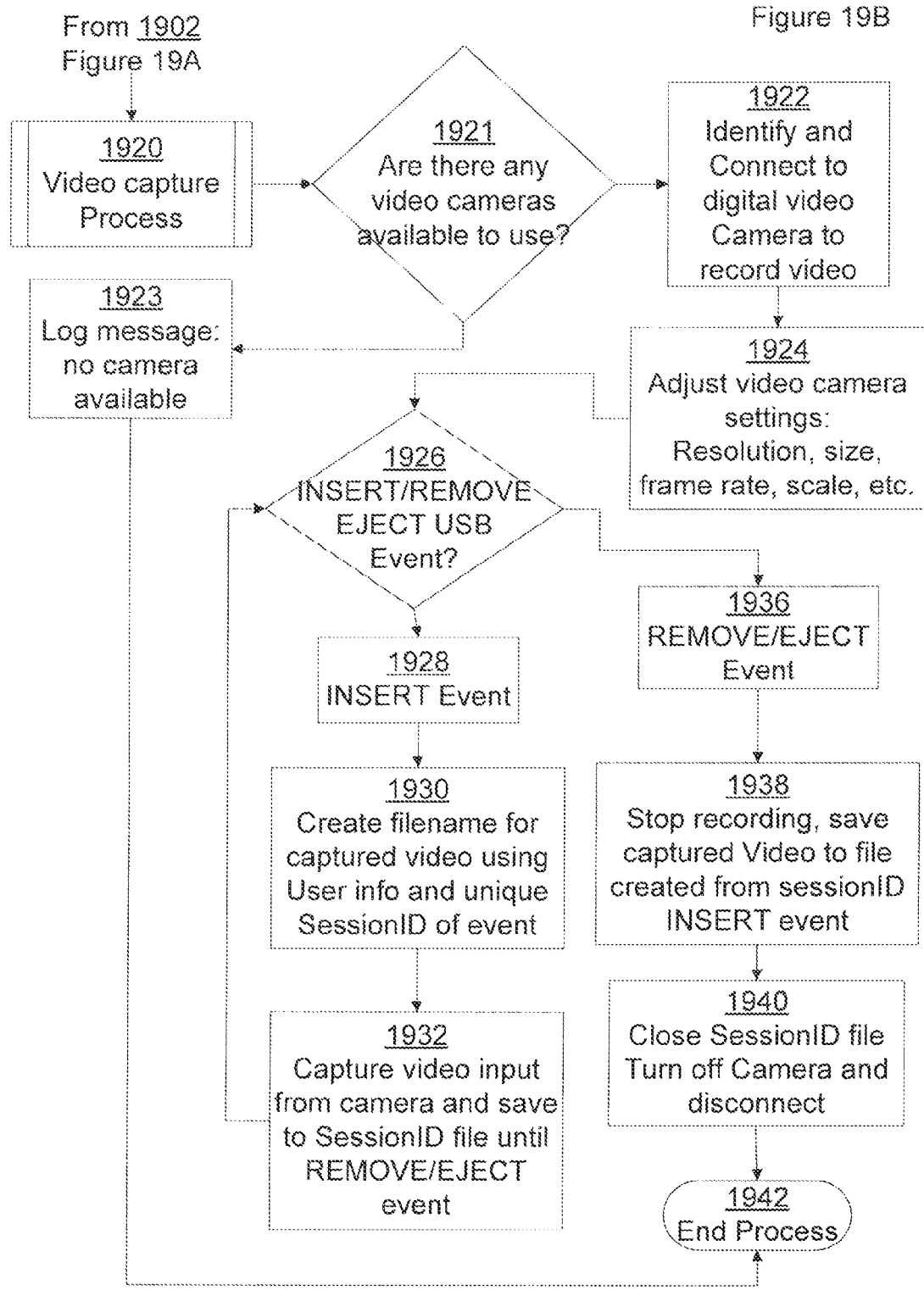

SYSTEM AND APPARATUS FOR CONTROLLING USE OF MASS STORAGE DEVICES

CROSS-REFERENCE TO RELATED APPLICATIONS

A claim of priority is made to U.S. Regular Utility application Ser. No. 12/156,664, filed Jun. 2, 2008, to be issued as U.S. Pat. No. 8,788,723 on Jul. 22, 2014, and which claimed the benefit of U.S. Provisional Application No. 60/932,860, filed Jun. 1, 2007, the contents both of which are incorporated in their entirety herein by reference.

FIELD OF THE DISCLOSURE

The present disclosure relates to USB devices and, more particularly, to detecting and controlling their use, particularly mass storage devices, in a computer.

BACKGROUND OF THE DISCLOSURE

As the popularity of USB devices continues to rapidly grow, so do the concerns about computer intrusion detection and protection from the use of these devices. For the security conscious, a new challenge is presented due to the advanced technological changes brought about by USB devices. The devices are rapidly decreasing in physical size and inversely increasing in storage capacity. The devices are basically undetectable in a person's pocket and their use has become ubiquitous. Computer security solutions have emerged outlining an individual's or an organization's position on the acceptable uses of USB policies. There still does not exist, however, a means for those responsible for the safeguarding of personal or corporate data to know the when, who, where and how of USB device usage.

It is therefore an object of the disclosure to detect the insertion/connection of USB devices.

It is another object of the disclosure to detect the removal/disconnection of USB devices.

It is a further object of the disclosure to provide a policy statement challenge upon the insertion/connection of a USB device, if so configured.

It is a still further object of the disclosure to eject a USB device that does not accept a policy statement challenge, if so configured.

It is a yet another object of the disclosure to eject a USB device if configured to not allow the use of USB devices when connected to a network.

It is another object of the disclosure to eject a USB device if configured to not allow the use of USB devices when not connected to a network.

It is a further object of the disclosure to allow a computer to go into a hibernation state while monitoring USB ports, if so configured.

It is a still further object of the disclosure to not allow a computer to go into a hibernation state while monitoring USB ports, if so configured.

It is another object of the disclosure to provide a policy challenge statement if so configured.

It is a yet further object of the disclosure to allow the use of the USB device if the policy statement is accepted.

It is an additional object of the disclosure to not allow the use of the USB device if the policy is not accepted.

It is a further object of the disclosure to not provide a policy challenge statement if so configured.

It is another object of the disclosure to provide a choice of a standard telecommunication standard to be used as the means of transmitting detected USB events to a local or remote datastore repository for storage, encrypted or unencrypted.

It is yet another object of the disclosure to provide read only access from the computer operating system to the inserted mass storage device if so configured.

It is still another object of the disclosure to provide read and write access from the computer operating system to the inserted mass storage device if so configured.

It is a further object of the disclosure to take a digital image of the computer user with a camera installed in, or connected to the computer when a USB Mass Storage Device is inserted into the computer if the policy is so configured. The digital image will be filed using the computer operating system and shall have a filename associated with the guaranteed unique session identifier of the insert event.

It is a yet further object of the disclosure to take a digital image of the computer user with a camera installed in, or connected to the computer when a USB Mass Storage Device is removed from the computer if the policy is so configured. The digital image will be filed using the computer operating system and shall have a filename associated with the guaranteed unique session identifier of the remove event.

It is a still further object of the disclosure to take a digital image of a computer user with a camera installed in, or connected to the computer when a USB Mass Storage Device is ejected from the computer operating system and prevented from being used by the computer operating system if the policy is so configured. The digital image will be filed using the computer operating system and shall have a filename associated with the guaranteed unique session identifier of the ejected event.

It is another object of the disclosure to start a digital image video recording with a video camera installed in, or connected to the computer when a USB Mass Storage Device is inserted into the computer if the policy is so configured. The digital image video recording will continue to record until the USB device is removed or ejected from the computer system or the computer operating system. The video recording will be filed using the computer operating system and shall have a filename associated with the guaranteed unique session identifier of the insert event.

It is yet another object of the disclosure to stop a digital image and/or video recording using a camera and/or video camera installed in, or connected to the computer when a USB Mass Storage Device is removed from the computer if the policy is so configured. The digital image and/or video recording will be filed using the computer operating system and shall have a filename associated with the guaranteed unique session identifier of the remove event.

It is still another object of the disclosure to stop a digital image and/or video recording using a camera or video camera installed in, or connected to the computer when a USB Mass Storage Device is ejected from the computer operating system and prevented from being used by the computer operating system if the policy is so configured. The digital image and/or video recording will be filed using the computer operating system and shall have a filename associated with the guaranteed unique session identifier of the ejected event.

SUMMARY OF THE DISCLOSURE

In accordance with the present disclosure, there is provided a software program, USBMon, that monitors all USB ports of a computer and provides real-time detection of all USB devices connected to a USB port. As a USB device is detected, the device is identified, categorized, catalogued and logged in a secure persistent store, and prompted for a challenge policy of use if so configured. The USB device is prevented from being used if so configured. Transmit information about the detected USB device is sent to a local or remote datastore repository by a selected industry standard telecommunication method configured as a secured or as an unsecured communication protocol.

For purposes of clarity and brevity, like elements and components will bear the same designations and numbering throughout the figures.

BRIEF DESCRIPTION OF THE DRAWINGS

FIG. 1 is a diagrammatic representation of the disclosure according to one embodiment of the disclosure.

FIG. 2A is a first section of a block diagram of a main entry portion of the disclosure according to one embodiment of the disclosure.

FIG. 2B is a second and final section of the block diagram shown in FIG. 2A.

FIG. 3A is a first section of a block diagram of a heartbeat process portion of the disclosure according to one embodiment of the disclosure.

FIG. 3B is a second and final section of the block diagram shown in FIG. 3B.

FIG. 4A is a first section of a block diagram of USB event processor portion of the disclosure according to one embodiment of the disclosure.

FIG. 4B is a second and final section of the block diagram shown in FIG. 4A.

FIG. 6 is a block diagram of a USB File IO Control portion of the disclosure according to one embodiment of the disclosure.

FIG. 7 is a block diagram of a USB Media Control portion of the disclosure according to one embodiment of the disclosure.

FIG. 8B is a second section of the block diagram shown in FIG. 8A.

FIG. 8C is a third and final section of the block diagram shown in FIG. 8A.

FIG. 10A is a first section of a block diagram of a USB Policy Challenge and Usage portion of the disclosure according to one embodiment of the disclosure.

FIG. 11 is a block diagram of a NagWare Display Processor portion of the disclosure according to one embodiment of the disclosure.

FIG. 12 is a block diagram of a USBMon Command, Control, Configuration Service portion of the disclosure according to one embodiment of the disclosure.

FIG. 13 is a block diagram of a USB MSD Volume Watch portion of the disclosure according to one embodiment of the disclosure.

FIG. 14 is a block diagram of a USB Watch Directory portion of the disclosure according to one embodiment of the disclosure.

FIG. 15 is a block diagram of a Process USB Device I/O Events portion of the disclosure according to one embodiment of the disclosure.

FIG. 16 is a block diagram of a Process USB Online Device I/O Events according to one embodiment of the disclosure.

FIG. 18A is a first section of a USB Mass Storage Policy Statement according to one embodiment of the disclosure.

FIG. 18B is a second and final section of the USB Mass Storage Policy Statement shown in FIG. 18A.

FIG. 19B is a second and final section of the block diagram shown in FIG. 19A.

DETAILED DESCRIPTION OF THE DISCLOSURE

In one aspect of the disclosure as shown in FIG. 1, a computer implemented USB monitoring system or software agent ("USBmon") application process [102] obtains its' configuration and licensing information from their respective programs and datasets [101][103]; communication with local or remote management station [105][106]; communication with a command, control and configuration service [100]; monitoring of USB ports and devices [107][108].

FIGS. 2A and 2B show a main entry view of a computer implemented USBmon application process [200] in which the process establishes configuration parameters (configuration dataset), real-time logging [201][202][203][204]; determines event notification methods, network connections used [205-210]; setting policy for read only or read and write only device access, online and offline USB usage policies and controls, setting policy for allowing/disallowing the capture of a camera image or a camera video recording [FIG. 2A 211-212][FIG. 2B 215, 225-227], online and offline USB policy and controls [211-212]; creation of a heartbeat monitoring process [215-217], registration of this process for all USB generated events [218-221]; creation of inter-process communication with USBmon service [222]; and creation of main USB event processor [223].

FIGS. 3A and 3B shows a detailed view of a computer implemented heartbeat process [300] that runs at a configured periodic interval, in minutes, [301,302][311,312][314,315], to check network connections, changes in configuration parameters, changes in event notification methods [303-310], enforcement of offline and online USB usage policies, allow or disallow read/write or read-only use of USB devices, allow/disallow the image capture or video capture recording of USB events [316-323][FIG. 3B, 330-334], and the transmission of a heartbeat to a local or a remote network management station indicating that the application is working [310] at periodic intervals [311,312,314,315].

FIGS. 4A and 4B show a detailed view of a computer implemented USB event main processor in which the processor determines the type of USB event received, performs real-time logging, validates proper product licensing, enforces USB device usage policies and transmits USB event notifications to a remote or a local network management server. FIGS. 4A and 4B further show the processing of a startup event [401][402][409-427].

Figure 5:
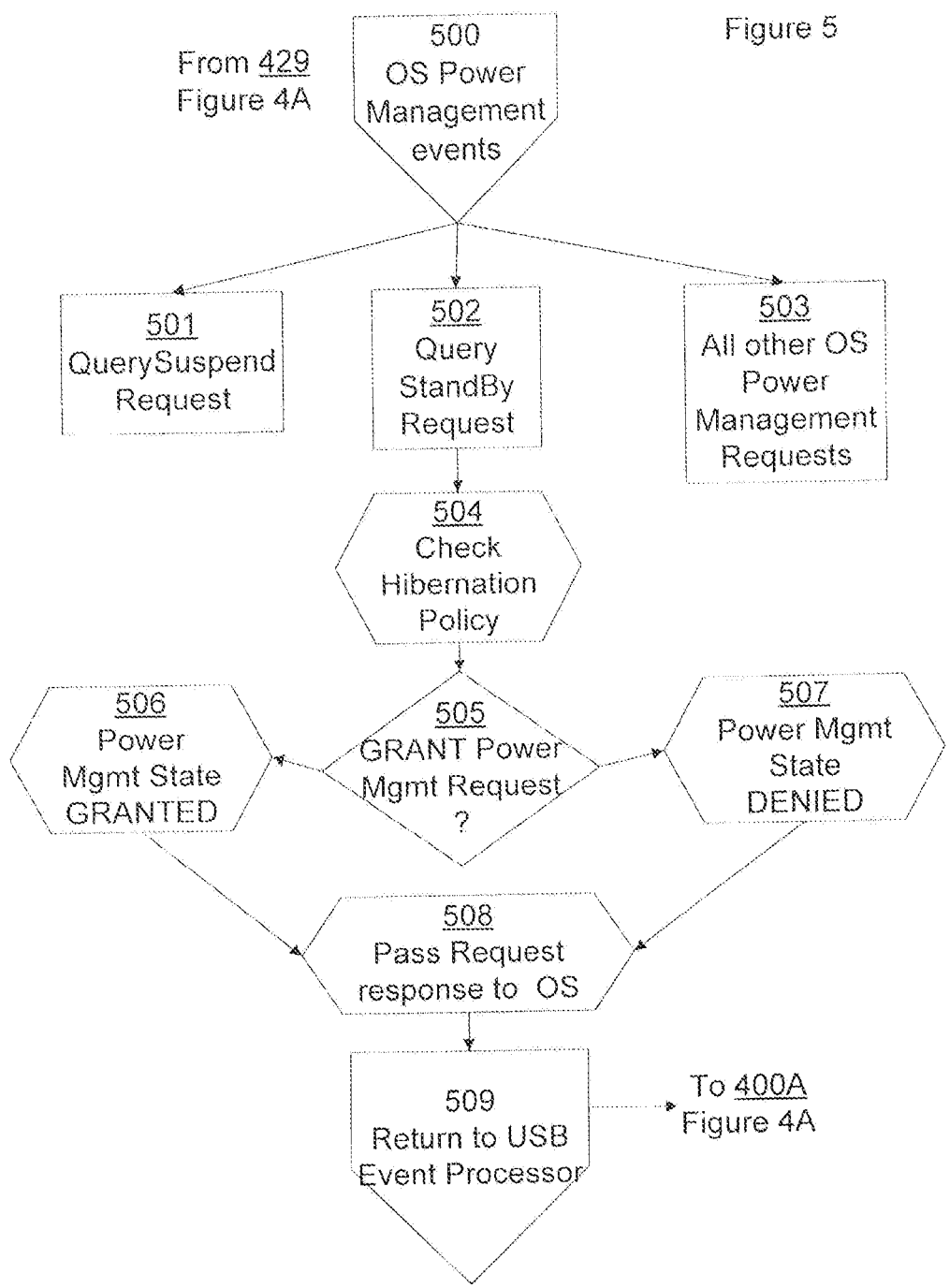
FIG. 5 is a block diagram of a USB Power Management portion of the disclosure according to one embodiment of the disclosure.

FIG. 5 shows a detailed view of a computer implemented USB event processor for power management [500] requests issued by the operating system of the computer in which the power management event type is determined [501][502][503], real-time logging of the information, and if configured, to allow a hibernation state [504] then the request is granted [506] to the operating system to allow hibernation [508]; otherwise the request is denied [507] and the operating will not go into hibernation [508]. A grant or a deny decision is passed on to the control of the operating system [509].

FIG. 6 shows a detailed view of a computer implemented USB events processing for copy & paste, drag & drop, all clipboard processed data [600] in which the data is processed [602][603][604]; real-time logging of the acquired data, enforcement of USB usage policy [605][606] if configured to allow [609,610,611,612], or disallow [607,608,612] writing of this data to a USB mass storage device, then passing on of the data to the operating system for other processing [612]; and then returning control to the operating system [613].

FIG. 7 shows a detailed view of a computer implemented USB processor for handling of all media related events [700] issued by the operating system in which the process determines [701] the media event type [702,703,704]; drive mapping, assigned operating system full pathname [705,706,707]; real-time logging of the media information to an encrypted datastore [708]; categorization of the media type event [709,710,711]; and storage of the USB event type to an encrypted datastore, followed by the performance of a transmission of a media event notification to a local or a remote network management server containing the media type event with the information describing the USB media [713][714]. Control is then returned back to the operating system [715].

Figure 8A:
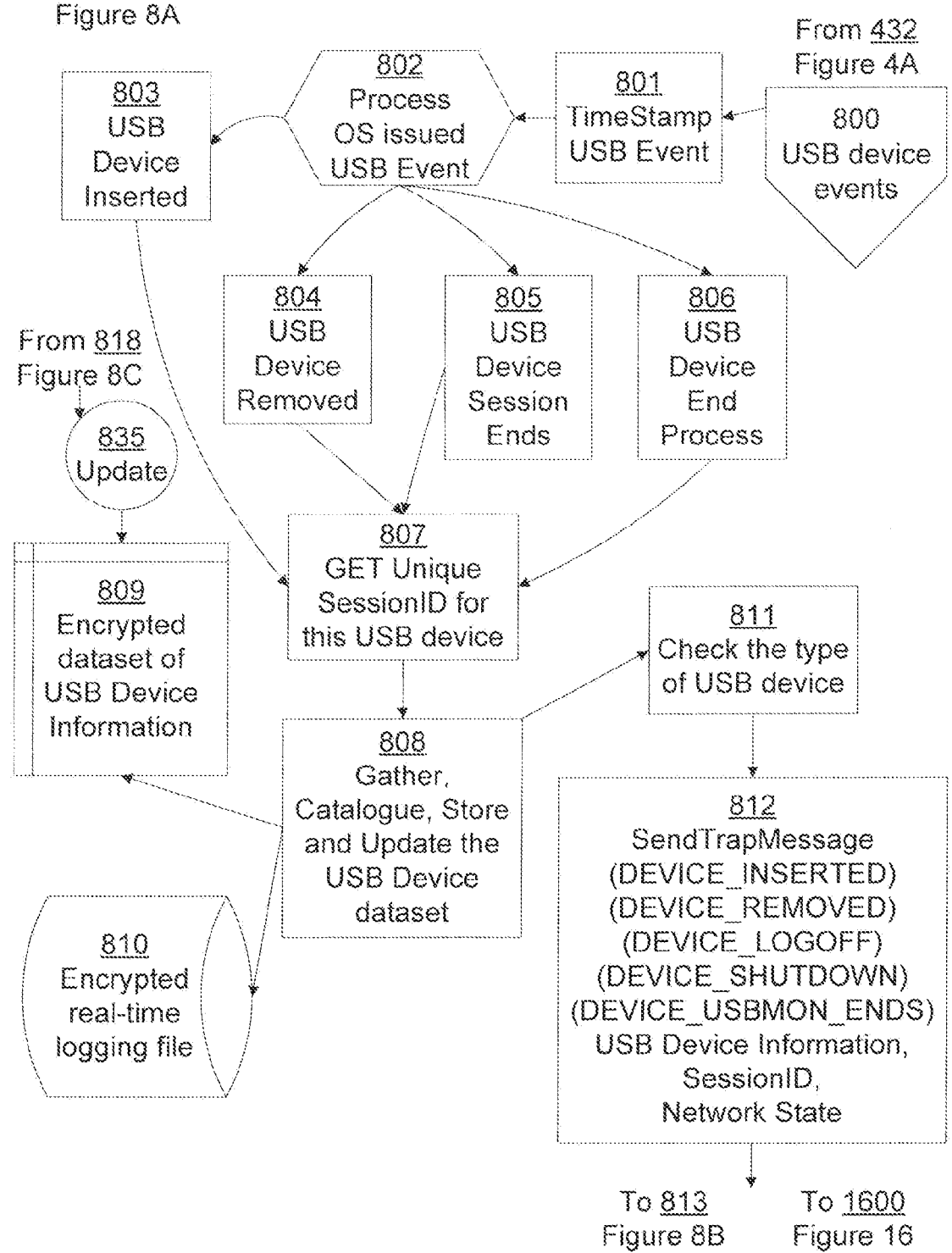
FIG. 8A is a first section of a block diagram of USB Device Event Processor portion of the disclosure according to one embodiment of the disclosure.

Referring now to FIGS. 8A, 8B and 8C, a detailed view of a computer implemented USB device event core processor is shown for all USB issued events from the operating system [800]. Each USB event received is given a timestamp [801] and then processed based upon the issued USB event [802]. The issued events detected are USB device inserted [803], USB device remove [804], USB device session ends [805], and USB device end process [806]. As each event is identified, the device associated to this event is assigned a guaranteed unique session identifier [807]. The USB device's information (dataset) is obtained from the USB device and catalogued [808]. The dataset is stored and updated in an encrypted datastore [809], and then logged in a real-time encrypted datastore [810] for logging. The USB device is then checked for the type of USB device [811] and an event notification containing the USB device information, unique session identifier, the network state and the type of the USB event [812] is sent to a local or a remote network management station (as shown in FIG. 16).

The counter [813] for the number of events for this USB device event is incremented and stored with this device's dataset [835]. The device event type is checked for an insert event [814], and if it is not [815], then the event type is a remove, a logoff, a shutdown, or an end. The USB device notifications requests are then unregistered [816] from the operating system. The USB device dataset [817] for this unique session for this device is then updated [818] in the encrypted dataset. The watch process on the volume for this dataset is then closed [819]. The watch process on the device mass storage device [820] is then closed.

Figure 10B:
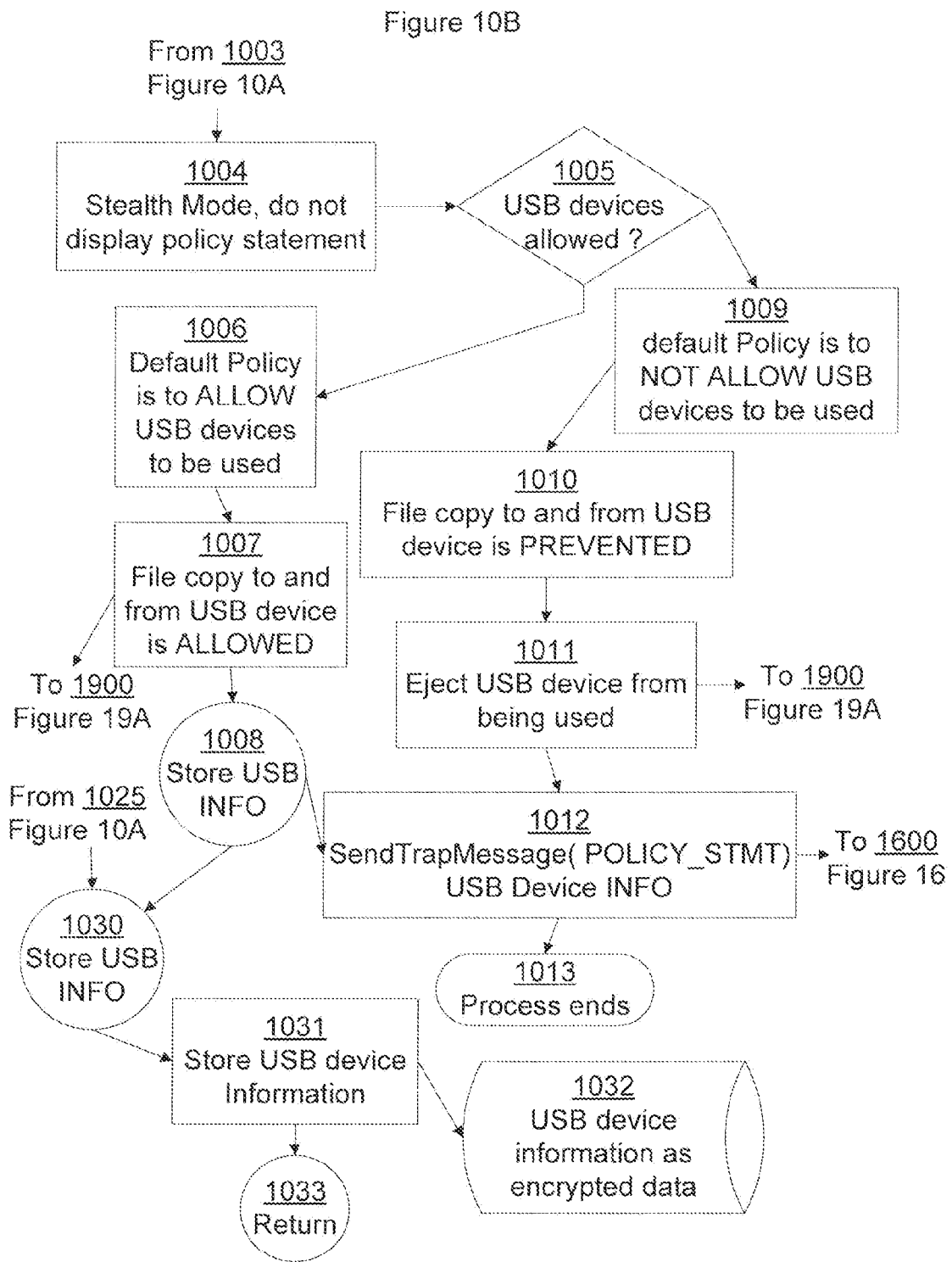
FIG. 10B is a second and final section of the block diagram shown in FIG. 10A.

If this is a shareware [821] product, the nagware (as shown in FIG. 11) policy [822] is displayed and then returned [823] to the USB event processor (FIGS. 4A and 4B). If the event type is an insert [824] then the challenge policy process (as shown in FIGS. 10A and 10B) is launched. Enforcement of the online or offline USB device usage policy [825] is accomplished by checking the device usage policy [826]. If the USB usage policy is set to not allow the use of USB devices then the system prevents all file input/output operations for this USB device [827], followed by ejecting the USB device from the operating system [828]. A check is then made for a shareware version [829]. If this is a shareware [821] product, the nagware (FIG. 11) policy is displayed [822] and then the system returns [823] to the USB event processor (FIGS. 4A and 4B).

If the USB usage policy is to allow the use of USB devices [826], then a check is performed if the inserted device is a mass storage device (msd) [830]. If it is not an msd [831], then the system monitors the USB device [832]. A check for a shareware version [829] is also made. If this is a shareware [821] product, the nagware (FIG. 11) policy is displayed [822] and then the system returns [823] to the USB event processor (FIGS. 4A and 4B). If this is an msd [833] and the use of this device is allowed, the system initiates a watch on the volume [834] of this msd, which is created (FIG. 13) and a watch process [832] on the USB msd is created (FIG. 14). A check for a shareware version [829] is also performed. If this is a shareware [821] product, the nagware (FIG. 11) policy [822] is displayed, and then the system returns [823] to the USB event processor (FIGS. 4A and 4B).

Figure 9:
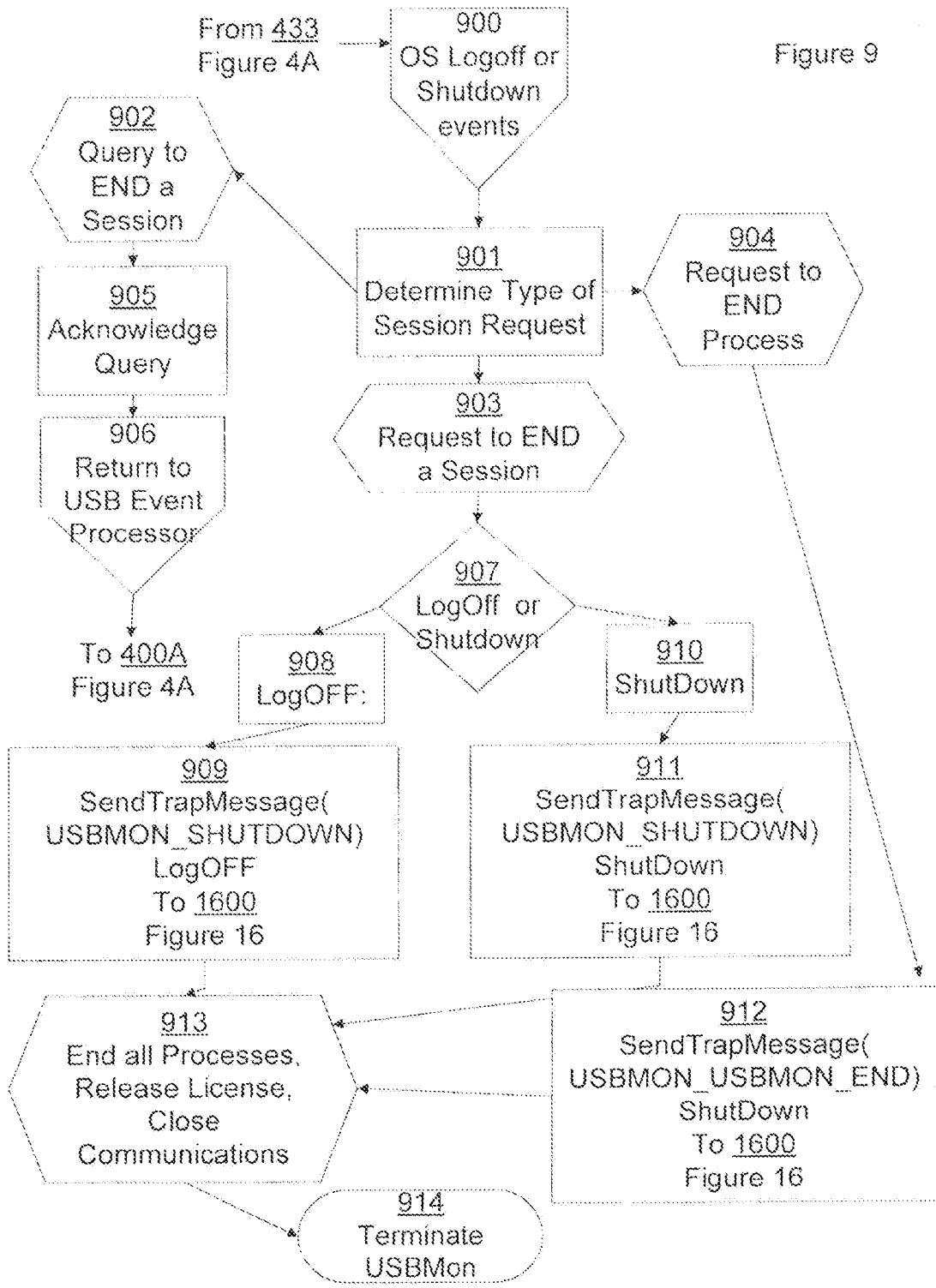
FIG. 9 is block diagram of an OS Logoff or Shutdown portion of the disclosure according to one embodiment of the disclosure.

FIG. 9 is a detailed view of a computer implemented USB event processor for all requests, queries and commands from the operating system to logoff, shutdown, suspend, and/or hibernate [900] the USBmon process or the computer. The type of power management request is determined [901]. A query to end the process [902] is acknowledged [905] and control is returned back to the operating system. A request to end the USBmon process [904] results in an event notification being sent to a local or a remote network management [912], all processes are ended, licenses are released and communications are closed [913], and the USBmon process ends [914]. If a request to end a USBmon session [903] is received, the request is then determined [907] for either a logoff request [908] or a shutdown request [910].

A logoff event request results in an event notification being sent to a local or a remote network management [909] indicating that the user has logged off, all processes are ended, licenses are released and communications are closed [913], and the USBmon process ends [914]. A shutdown event request results in an event notification being sent to a local or a remote network management [911] indicating that the computer is shutting down, all processes are ended, licenses are released and communications are closed [913], and the USBmon process ends [914].

FIGS. 10A and 10B show a detailed view of a computer implemented policy challenge processor in which USB device insertions detected by the operating system result in the popup display of a policy challenge statement (such as the illustrative example in FIGS. 18A and 18B) that can either be accepted or not accepted. This policy statement is a configurable text file that may be modified to reflect the usage of USB devices inserted into the computer in either an online or an offline network state. The usage of USB devices may be allowed or not allowed in either an online or an offline network state.

The usage of USB devices may be set to read-only access or read and write access by the computer operating system while allowed or not allowed in either an online or an offline network state. The insertion/removal/ejection of USB devices may be set to capture a camera and/or video image of the user of the USB event by the computer operating system while allowed or not allowed in either an online or an offline network state. If implemented, an insertion/removal and/or ejection of a USB device event will trigger the activation of an installed or connected camera and/or video recording device to photograph or videograph the computer user during the USB device event. The insertion/removal/ejection of USB devices also may be set to record a camera video recording of the user of the USB event by the computer operating system while allowed or not allowed in either an online or an offline network state. The display of the policy challenge text may be displayed or not displayed in a popup window if the process has been so configured as to not display the policy [stealth mode].

The desired USB usage policy is enforced by the USB event processor (FIGS. 8A, 8B and 8C) as the USB device event is processed. This policy challenge process is created and launched [1000] by the USB event processor (FIGS. 8A, 8B and 8C), and all data provided by the USB device is gathered [1001] and stored in an encrypted datastore [1002]. The condition to display the policy is checked [1003], and if the configuration is set to not display the policy statement [1004], then the policy statement is not displayed. If the configuration is set to display the policy statement [1014], then the policy statement is displayed in a popup window and the user must answer yes or no to this challenge policy. If the policy is not to be displayed [1004], then the configuration policy for the usage of USB devices is checked [1005] to determine the allowed usage of USB devices [1006][1009].

If the policy is to not allow the use of USB devices [1009], then the operating system file input/output operations to and from the USB device is prevented [1010]. The USB device is then ejected from the operating system [1011]. A USB event notification is then sent to the USB event processor (FIG. 16) with the policy statement as being rejected and all the information describing the USB device inserted [1012]. The policy challenge process ends and returns to the operating system [1013]. If the policy is to allow the use of USB devices [1006], then the operating system file input/output operations to and from the USB device are allowed [1007].

If the policy is to allow read-only access to the inserted USB device then the computer operating system is configured to allow read access only by the computer operating system. If the policy is to allow read and write access to the USB inserted device then the computer operating system is configured to allow read and write access by the computer operating system [1006-1007].

If the policy is to permit a camera image to be taken of the user when an insert/remove/eject of a USB device event occurs, then an image capture process is implemented to capture the digital camera image and to save this digital image to a unique filename associated with and respective to the unique session identifier of the digital camera image of the user [1018][1024][FIG. 19]. If the policy is to permit a camera digital video recording to be taken of the user when an insert/remove/eject of a USB device event occurs, then a video capture process is implemented to capture, record and to save the digital camera recording and to save the video recording to a unique filename associated with and respective to the unique session identifier of this digital video recording of the user [1018-1024][FIG. 19].

The information describing the USB device is stored [1008]. A USB event notification is then sent to the USB event processor (FIG. 16) with the policy statement as being accepted and all the information describing the USB device inserted [1012]. The policy challenge process ends and returns to the operating system [1013]. If the configured condition is checked to display the challenge policy [1014], then the policy statement text file is displayed in a popup window and the user must answer yes or no to this policy challenge [1015]. If the user answers no to this challenge, then the policy is not accepted and the use of USB devices is not allowed [1016], file input/output operations to and from the USB device are prevented [1017], the USB device is then ejected from the operating system [1018]. A USB event notification is then sent to the USB event processor (FIG. 16) with the policy statement as being rejected and all the information describing the USB device inserted [1028]. The policy challenge process ends and returns to the operating system [1029].

If the user answered yes to the policy challenge display [1015], then the policy challenge is accepted and the use of the USB device is allowed [1019]. If the policy is to permit read-only access to the inserted USB device, then the computer operating system is configured to allow only read access by the computer operating system. If the policy is to permit read and write access to the USB inserted device, then the computer operating system is configured to allow read and write access by the computer operating system [1023][1024].

If the policy is to permit a camera image to be taken of the user when an insert/remove/eject of a USB device event occurs, then an image capture process is implemented to capture the digital camera image and to save this digital image to a unique filename associated with and respective to the unique session identifier of the digital camera image of the user [1027][FIG. 19]. If the policy is to permit a camera digital video recording to be taken of the user when an insert/remove/eject of a USB device event occurs, then a video capture process is implemented to capture, record and to save the digital camera recording and to save this video recording to a unique filename associated with respective to the unique session identifier of the digital video recording of the user [1027][FIG. 19].

The communication layer is then checked for availability and network found condition to determine an online network or offline network [1020] state. If the network state is found to be online [1021] or offline [1022], then the USB usage policy configured for these states is enforced by checking this state [1023]. If the configured USB usage policy is to not allow the use of USB devices when offline, then the use of USB devices is not allowed, file input/output operations to and from the USB device are prevented [1026], and the USB device is then ejected from the operating system [1027]. A USB event notification is then sent to the USB event processor (FIG. 16) with the policy statement as being rejected and all the information describing the USB device inserted [1028]. The policy challenge process ends and returns to the operating system [1029].

If the policy is to allow the use of USB devices [1023] when online then the operating system file input/output operations to and from the USB device are allowed [1024]. The information describing the USB device is stored [1025]. A USB event notification is then sent to the USB event processor (FIG. 16) with the policy statement as being accepted and all the information describing the USB device inserted [1028]. The policy challenge process ends and returns to the operating system [1029].

FIG. 11 shows a detailed view of a computer implemented nagware process [1100] for the shareware version of the USBmon product in which the process is launched upon every USB device insertion or removal which subsequently pops up a policy statement [1101] indicating that this is a shareware version which may be upgraded to a registered version which will then allow full functionality. If the provided policy statement terms [1102] are not accepted [1105], then the usage of USB devices are not allowed [1106], file input/output operations are not allowed [1108], the USB device inserted is then ejected from the operating system [1109], and control is returned to the operating system [1110]. If the provided policy statement terms [1102] are accepted [1103], then the usage of USB devices are allowed [1104], file input/output operations are allowed [1107], and control is returned to the operating system [1110].

FIG. 12 shows a detailed view of a computer implemented USB command, control and configuration service [1200] that allows the USBmon process to be controlled from an intranet or an internet network management station over a secured and encrypted network communication connection between this service and the USBmon process. This service receives a requested action [1201], which is then determined to the type or requested action as a command request [1203], a control request [1204] or a configuration request [1205]. A command request [1203] is prepared [1206] and sent [1210] to the USBmon processor (FIGS. 4A and 4B) and this service then waits for any other requests [1211]. A control request [1204] is prepared [1207] and sent [1210] to the USBmon processor (FIGS. 4A and 4B) and this service then waits for any other requests [1211]. A configuration request [1205] is prepared and processed for any changes to the currently stored configuration dataset [1208] with any changes being updated and stored in the encrypted configuration dataset [1209]. This request is then sent [1210] to the USBmon processor (FIGS. 4A and 4B) and this service then waits for any other requests [1211].

FIG. 13 shows a detailed view of a computer implemented USB volume processor [1300] that watches all file input/output operations [1301] on a USB mass storage device that has been inserted into the computer, identified as a disk subsystem volume [1302] with an associated drive letter mapping [1303] and is being monitored by the USBmon processor [1304]. Results of processing this notification request is returned to the calling process [1305].

FIG. 14 shows a detailed view of a computer implemented USB watch directory processor [1400] that watches all file input/output on a USB mass storage device that has been inserted into the computer [1401], identified as a disk subsystem directory with an associated drive letter mapping and is being monitored by the USBmon processor. Processor [1400] checks the device type as a mass storage device [1402]. If media is not inserted in the device [1403] then the system waits for media to be inserted, or otherwise logs the USB device information [1405] to an encrypted real-time logging datastore [1406], creates and launches the process to monitor and controls USB input/output USB events [1407] then passes control to the USB events processor (FIGS. 4A and 4B).

FIG. 15 shows a detailed view of a computer implemented processor for all USB device input/output events [1500] in which the process waits for an operating system USB event [1501] that is received [1502], and processed to determine the type of input/output event [1505]. The processor gathers [1506] and stores all file information related to the event [1507], stores the data in an encrypted data store [1508], then sends a USB event notification [1509] that contains the gathered file information and the file action type to a local or a remote network management station [1510] and then is processed by the USB event processor (FIGS. 4A and 4B). If the process is requested to end [1503] then the watch process monitoring this USB device is ended [1504].

FIG. 16 shows a detailed view of a computer implemented process for USB online device i/o event notification [1600] message sent to a local or a remote network management station over secured or unsecured network, as configured by the USBmon configuration dataset. The received USB event notification is encrypted [1601] and stored in an encrypted dataset storage [1604], a send notification process is created and launched [1602] and then control is returned to the operating system [1603]. When the send notification process begins [1605], the USB event notification message is retrieved, processed by file input/output action and USB device information [1606], using the configured communication protocol configured for event transmission [1607], the communication protocol is checked for availability and a ready to send connection [1608]. If this communication protocol is not available to send then the process waits until readiness is confirmed. Once readiness is confirmed the dataset is processed [1609] by file input/output action type and the dataset is sent over the configured network communication configured [1610].

If the transmission is successful [1611]), then control is relinquished to the operating system [1615]. If the transmission has failed [1612] then the process enforces the USB offline policy, the USB dataset for this event message [1613] is stored in an encrypted datastore [1614] for processing by the USB offline device events processor. Control is relinquished to the operating system [1615].

Figure 17:
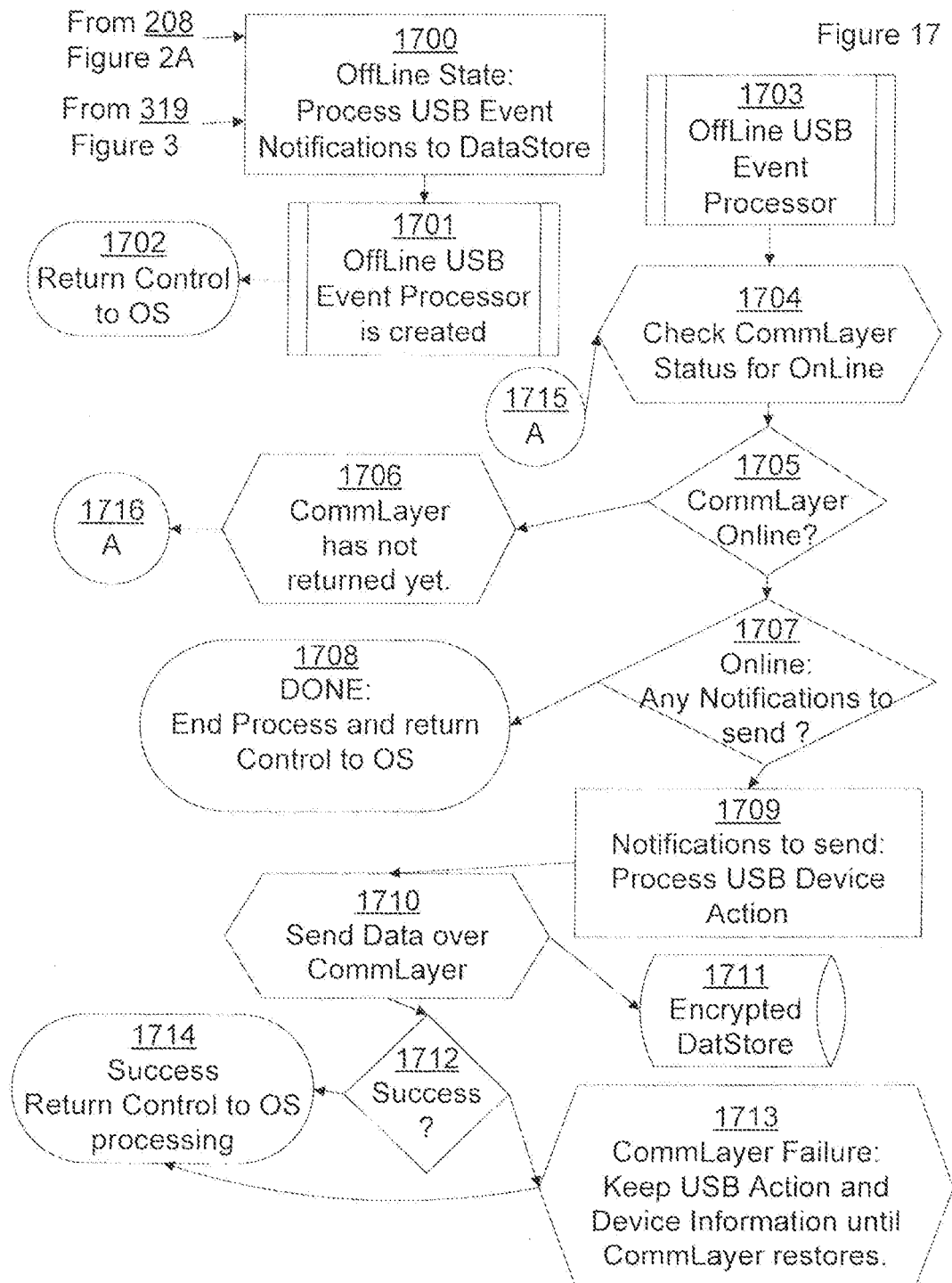
FIG. 17 is a block diagram of a Process USB Offline Device I/O Events according to one embodiment of the disclosure.

FIG. 17 is a detailed view of a computer implemented process for USB offline device i/o event processing [1700]. Starting this process creates a background process [1701] for real-time processing of event transmission once an online network connection is found [1703]. When the configured network connection [1704] is available and ready [1705], this process begins to transmit the stored USB event notifications [1707]. The data is retrieved from an encrypted datastore [1711], processed by file input/output action type and USB device information [1709], then sent [1710] to a local or a remote network management station as configured by the USBmon configuration dataset. If the communication protocol should fail [1712] during this process, the dataset is not removed [1713] from the datastore and the process reverts from an online mode back to the offline mode and offline policy enforcement of USB devices is enacted. If the event notification sent over this communication protocol is successful [1712], the dataset is deleted from the datastore and processing continues until all data contained within the encrypted datastore has been sent successfully [1714]. This process then relinquishes control back to the operating system.

Figure 19A:
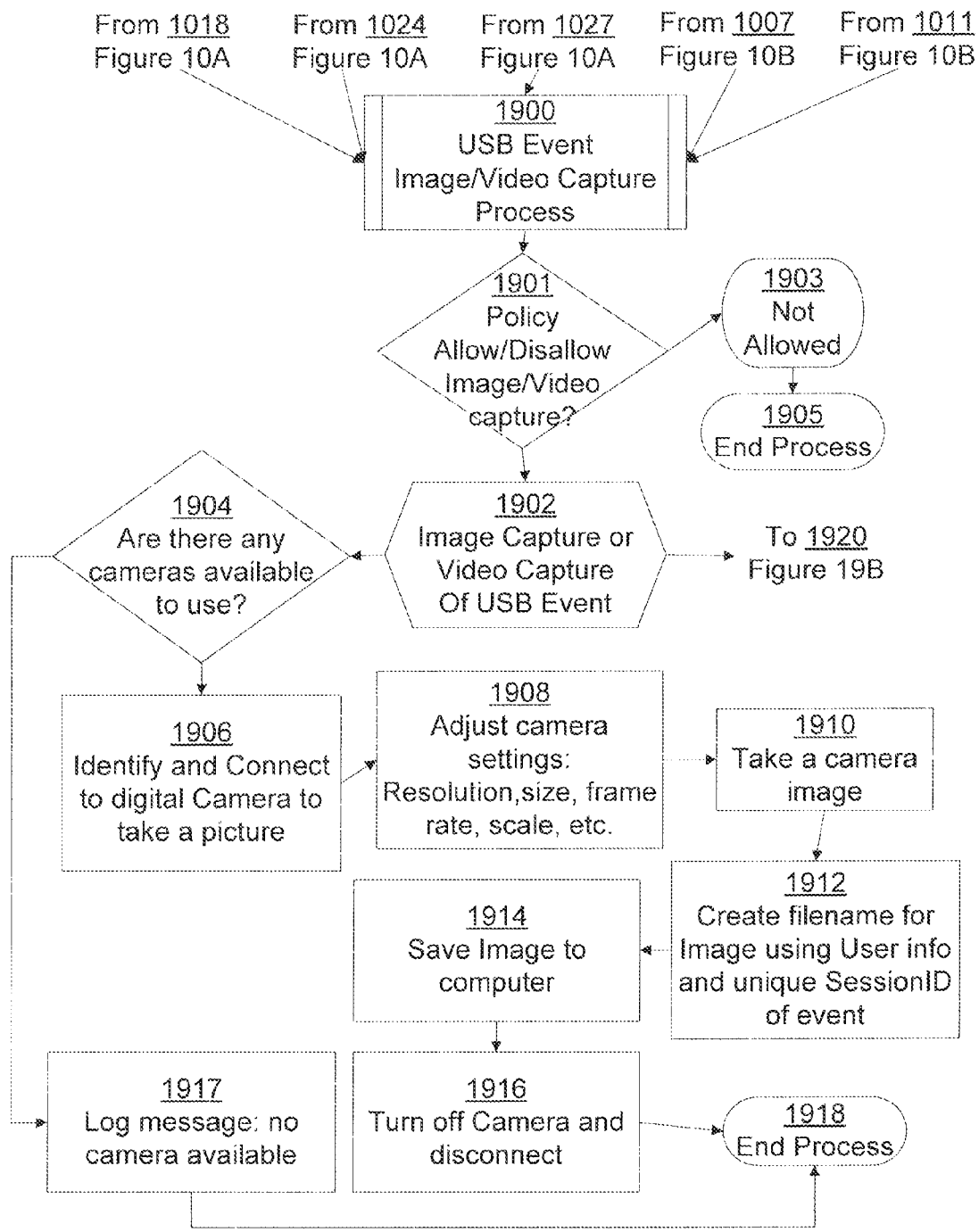
FIG. 19A is a first section of a block diagram of a USB event camera and video capture portion of the disclosure according to one embodiment of the disclosure.

Referring now to FIGS. 19A and 19B, in another aspect of the disclosure, a detailed view of a USB event camera and video capture operating process is shown in which USB device insertions, removals or ejections of a USB device detected by the operating system may activate one or more of the following operations. The system may be modified to include the steps of creating a digital image by activating a digital camera installed in, or connected to, the computer, storing on the computer system, an image in an image file format such as, but not limited to, bmp, jpg, etc. file formats, and saving the image to a file on the computer system using a filename associated with and respective to the unique session identifier created for the insert/remove/eject event (FIG. 8A, [807]). The system may also be modified to include the steps of creating a digital video recording captured by a digital camera, storing the recording on a computer system, in a video file format including, but not limited to, wav, avi, mpg, etc., and saving the recording to a file on the computer system using a filename associated with and respective to the unique session identifier created for the insert/remove/eject event (FIG. 8A, [807]).

The USB event image and capture processor [1900] determines which camera operation is to be performed at step [1901] depending upon whether the configured policy [1901] is set to allow [1902] or disallow [1903] the use of a digital camera image to be captured, or set to allow [1902] or disallow [1903] the use of a digital camera video to capture a video recording. If the policy is set to not allow the use of either a digital camera for an image capture or a video recording, then the process is terminated at step [1918] and no image or recording is created. When the policy is configured to allow the use of a digital camera image to capture an image at step [1902] or a digital video recording to capture a series of images at steps [1902-1920], the process performs the steps required to capture and to save this data as are well known in the art.

In capturing a digital image, the process identifies an available camera (installed or connected as a peripheral device to the computer) to use then connects to the selected available digital camera within the computer operating system at steps [1904-1906]. If no digital camera is located, then the process writes a log message at step [1917] and terminates the process at step [1918]. If the process finds an available digital camera at step [1904], then the process connects to this camera, identifies the operating system name assigned to this camera at step [1906], and sets the camera settings, illustratively, such as scale, frame rate, image resolution, image size, etc., at step [1908]. A digital camera image is then taken at step [1910], and the digital image is written by the computer operating system to a file having a filename [1912-1914] associated with the unique session identifier created for the USB event (FIG. 8A, [807]), in an image file format, including, but not limited to, bmp, jpg, etc. The process then disconnects from the digital camera releasing the camera from the computer operating system at step [1916] and terminates the image capture process at step [1918].

When the policy is configured to allow the use of a digital video camera to create a digital video recording at steps [1902-1920], the process performs the steps required to begin to capture and to save the video data. In capturing a digital video recording, the process identifies an available camera to use then connects to the digital camera available for use within the computer operating system at steps [1920-1922]. If no digital video camera is found, then the process writes a log message at step [1923] and terminates the process at step [1942].

If the process finds an available digital video camera, then the process connects to this camera, identifies the operating system name assigned to this camera, and sets the camera settings, including, but not limited to, scale, frame rate, image resolution, image size, etc., at steps [1922-1924]. The process then determines if the USB event detected for this unique session (FIG. 8A, [807]) is either an insert, a remove or an eject event at step [1926]. If the event is an insert event [1928], then a digital video camera recording of the USB event session begins by creating a filename of the video recording session associated with the user information and unique session identifier of the event, whereby the video capture is written to a video file by the computer operating system at steps [1930-1932] in a known standard video file format, including, but not limited to, wav, avi, mpg, mp3, mp4, etc.

The process continues to capture and record the USB event session and records it to the created associated file until either a remove or an eject USB event occurs at step [1926]. Upon detecting either a remove or an eject USB event at steps [1926-36], the process stops recording the digital video capture for the session at step [1938], closes the file associated with the session identifier, turns off the camera, disconnects from the digital video camera so as to release the camera from the computer operating system at step [1940] and terminates the digital video capture process at step [1942].

Since other modifications and changes varied to fit particular operating requirements and environments will be apparent to those skilled in the art, the disclosure is not considered limited to the examples chosen for purposes of disclosure, and covers all changes and modifications which do not constitute departures from the true spirit and scope of this disclosure.

Having thus described the disclosure, what is desired to be secure by United States Letters Patent is:

The invention claimed is:

1. A method of monitoring the use of mass storage devices connected to a computer Universal Serial Bus (USB) port comprising the steps of:
   detecting the presence of mass storage device connected to a computer USB port;
   creating a unique session identifier;
   displaying a mass storage device policy statement on a monitor setting forth mass storage device user conditions;
   prompting a computer user to respond to the policy statement by accepting or declining the statement; and controlling the mass storage device's access to the computer's operating system by permitting access if the user accepts the policy statement or preventing access if the user declines the policy statement, wherein the unique session identifier comprises a combination of the mass storage device type, mass storage device serial number, date and time of mass storage device computer access attempt and the computer operating system assigned drive letter designation for the computer port to which the mass storage device is attached; and,
   limiting the mass storage device's access to the computer's operating system as read-only access.

2. The method of claim 1 further comprising increasing the mass storage device's access to the computer's operating system as read and write access.

3. The method of claim 2 wherein the read and write access of the mass storage device is set by the computer operating system and allowed or not allowed in an online and/or an offline network state.

4. The method of claim 1 wherein the read-only access of the mass storage device is set by the computer operating system and allowed or not allowed in an online and/or an offline network state.

5. A method of monitoring the use of mass storage devices connected to a computer Universal Serial Bus (USB) port comprising the steps of:
   providing a computer with a USB port and a digital camera installed in the computer and operated by the computer operating system;
   detecting the presence of a mass storage device connected to the computer USB port;
   creating a unique session identifier;
   displaying a mass storage device policy statement on a monitor setting forth mass storage device user conditions;
   prompting a computer user to respond to the policy statement by accepting or declining the statement; and controlling the mass storage device's access to the computer's operating stem by permitting access if the user accepts the policy statement or preventing access if the user declines the policy statement, wherein the unique session identifier comprises a combination of the mass storage device type, mass storage device serial number, date and time of mass storage device computer access attempt and the computer operating system assigned drive letter designation for the computer port to which the mass storage device is attached; and, making a digital image with the installed digital video recorder when the mass storage device is inserted into the USB port.

6. The method of claim 5 further comprising the step of making a digital image when the mass storage device is removed from the computer USB port.

7. The method of claim 6 further comprising the step of creating a file of the digital image with the computer operating system and assigning the file a filename associated with the unique session identifier.

8. The method of claim 7 further comprising the step of making a digital image when the mass storage device is ejected from the computer operating system.

9. The method of claim 8 further comprising the step of creating a file of the digital image ejection event with the computer operating system and assigning the file a filename associated with the unique session identifier.

10. The method of claim 5 further comprising the step of creating a file of the digital image with the computer operating system and assigning the file a filename associated with the unique session identifier.

11. The method of claim 5 further comprising the step of recording information about all files located in the computer copied from the mass storage device, or written to the mass storage device, wherein the information includes the file name and the date and time when the file was copied or written.

12. A method of monitoring the use of mass storage devices connected to a computer Universal Serial Bus (USB) port comprising the steps of:
   providing a computer with a USB port and a digital video recorder installed in the computer and operated by the computer operating system;
   detecting the presence of a mass storage device connected to a USB port of a computer;
   creating a unique session identifier;
   displaying a mass storage device policy statement on a monitor setting forth mass storage device user conditions;
   prompting a computer user to respond to the policy statement by accepting or declining the statement; and controlling the mass storage device's access to the computer's operating system by permitting access if the user accepts the policy statement or preventing access if the user declines the policy statement, wherein the unique session identifier comprises a combination of the mass storage device type, mass storage device serial number, date and time of mass storage device computer access attempt and the computer operating system assigned drive letter designation for the computer port to which the mass storage device is attached; and,
   making a digital image video recording with the installed digital video recorder when the mass storage device is inserted into the USB port.

13. The method of claim 12 further comprising the step of stopping the video recording when the mass storage device is removed from the computer USB port.

14. The method of claim 13 further comprising the step of creating a file of the digital image video recording stop event with the computer operating system and assigning the file a filename associated with the unique session identifier.

15. The method of claim 12 further comprising the step of stopping the video recording when the mass storage device is ejected from the computer operating system.

16. The method of claim 13 further comprising the step of creating a file of the digital image video recording ejection event with the computer operating system and assigning the file a filename associated with the unique session identifier.

17. The method of claim 12 further comprising the step of creating a file of the digital image video recording with the computer operating system and assigning the file a filename associated with the unique session identifier.

18. The method of claim 1 further comprising the steps of:
   providing a USB monitoring software agent in the computer for tracking files read from, or written to, the mass storage device;
   allowing the mass storage device to read and/or write files located in the computer after the policy statement is accepted by the computer user; and,
   tracking files read from, or written to, the mass storage device.

19. The method of claim 18 further comprising the step of storing file information about files read from, or written to, the mass storage device in a database.

20. The method of claim 1 further comprising creating a log event wherein the unique session identifier is recorded in the log event.

* * * * *